United States Patent
Helleren

(10) Patent No.: US 10,592,345 B2
(45) Date of Patent: *Mar. 17, 2020

(54) CLUSTERED FAULT TOLERANCE SYSTEMS AND METHODS USING LOAD-BASED FAILOVER

(71) Applicant: Chicago Mercantile Exchange Inc., Chicago, IL (US)

(72) Inventor: Erik Helleren, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/926,309

(22) Filed: Mar. 20, 2018

(65) Prior Publication Data
US 2018/0210791 A1    Jul. 26, 2018

Related U.S. Application Data

(63) Continuation of application No. 14/930,165, filed on Nov. 2, 2015, now Pat. No. 9,952,932.

(51) Int. Cl.
*G06F 11/00* (2006.01)
*G06F 9/00* (2006.01)
(Continued)

(52) U.S. Cl.
CPC ........ *G06F 11/1441* (2013.01); *G06F 9/4856* (2013.01); *G06F 9/505* (2013.01);
(Continued)

(58) Field of Classification Search
CPC .............................. G06F 9/4856; G06F 9/505
See application file for complete search history.

(56) References Cited

U.S. PATENT DOCUMENTS 4,099,235 A * 7/1978 Hoschler ............... G06F 15/161
                                                                   718/105
4,403,286 A * 9/1983 Fry ........................ G06F 9/505
                                                              710/15

(Continued)

FOREIGN PATENT DOCUMENTS

EP    1516252 B1    12/2008
EP    2608027 A3     7/2014

OTHER PUBLICATIONS

"A High-Throughput Distributed Messaging System", Apache Kafka, retrieved Oct. 30, 2015, 37 pages, http://kafka.apache.org/documentation.html#distributionimpl.

(Continued)

*Primary Examiner* — Marc Duncan
*Assistant Examiner* — Jonathan D Gibson
(74) *Attorney, Agent, or Firm* — Lempia Summerfield Katz LLC

(57) ABSTRACT

A computer implemented method for providing fault tolerance to a plurality of machines includes determining an aggregate load for each surviving machine of a plurality of surviving machines; calculating a recovery load of one or more orphaned jobs resulting from a terminating event; and selecting to recover and perform one or more of the orphaned jobs, by one or more of the surviving machines, based upon (i) the recovery load of the one or more orphaned jobs; (ii) the job load of the one or more orphaned jobs; and (iii) the aggregate loads of the surviving machines.

20 Claims, 13 Drawing Sheets

(51) Int. Cl.
 *G06F 11/14* (2006.01)
 *G06F 9/48* (2006.01)
 *G06F 9/50* (2006.01)

(52) U.S. Cl.
 CPC .......... *G06F 9/5072* (2013.01); *G06F 9/5083* (2013.01); *G06F 9/5088* (2013.01); *G06F 11/1474* (2013.01); *G06F 2201/805* (2013.01); *G06F 2201/85* (2013.01)

(56) References Cited

U.S. PATENT DOCUMENTS

| | | | | |
|---|---|---|---|---|
| 4,413,318 | A * | 11/1983 | Herrington | G06F 9/54 718/100 |
| 4,495,570 | A * | 1/1985 | Kitajima | G06F 9/505 713/502 |
| 4,577,272 | A * | 3/1986 | Ballew | G06F 11/201 709/239 |
| 4,839,798 | A * | 6/1989 | Eguchi | G06F 9/5088 709/201 |
| 4,852,001 | A * | 7/1989 | Tsushima | G05B 19/41865 705/7.16 |
| 5,031,089 | A * | 7/1991 | Liu | G06F 9/5088 709/201 |
| 6,757,730 | B1 * | 6/2004 | Lee | G06F 9/465 709/201 |
| 9,183,049 | B1 * | 11/2015 | Corley | G06F 9/48 |
| 9,239,996 | B2 * | 1/2016 | Moorthi | G06Q 10/06 |
| 9,524,330 | B1 * | 12/2016 | Allocca | G06Q 30/06 |
| 9,891,941 | B2 * | 2/2018 | Jul | G06F 9/45558 |
| 9,946,563 | B2 * | 4/2018 | Geibel | G06F 9/45558 |
| 9,952,932 | B2 * | 4/2018 | Helleren | G06F 11/1441 |
| 2004/0205414 | A1 * | 10/2004 | Roselli | H02H 3/05 714/39 |
| 2009/0006309 | A1 * | 1/2009 | Hunt | G06Q 30/02 |
| 2009/0055834 | A1 * | 2/2009 | Ding | G06F 11/3447 718/104 |
| 2012/0066541 | A1 | 3/2012 | Dournov et al. | |
| 2013/0262638 | A1 * | 10/2013 | Kumarasamy | G06F 15/177 709/221 |
| 2014/0033222 | A1 | 1/2014 | Jeyapaul et al. | |
| 2015/0052531 | A1 * | 2/2015 | Helak | G06F 9/4856 718/102 |
| 2017/0123929 | A1 * | 5/2017 | Helleren | G06F 11/1441 |
| 2018/0210791 | A1 * | 7/2018 | Helleren | G06F 11/1441 |

OTHER PUBLICATIONS

"YARN—The Architectural Center of Enterprise Hadoop", Hortonworks, retrieved Oct. 30, 2015, 3 pages, http://hortonworks.com/hadoop/yarn/.

International Search Report and Written Opinion, from PCT/US2016/059319, dated Jan. 31, 2017, WO.

* cited by examiner

CLUSTERED FAULT TOLERANCE SYSTEMS AND METHODS USING LOAD-BASED FAILOVER

PRIORITY CLAIM

This application claims priority to and the benefit as a continuation of U.S. patent application Ser. No. 14/930,165, filed Nov. 2, 2015, entitled, "Clustered Fault Tolerance Systems And Methods Using Load-Based Failover", now U.S. Pat. No. 9,952,932, issued Apr. 24, 2018, incorporated by reference herein.

BACKGROUND

Electronic marketplaces may implement fault tolerance systems to help ensure application and/or system uptime and reliability. Fault tolerance is generally regarded as the ability to mask, or recover from, erroneous conditions in a system once an error has been detected. Fault tolerance is typically desired for mission critical systems or applications. "Mission critical" typically refers to an indispensable operation that cannot tolerate intervention, compromise, or shutdown during the performance of its primary function, e.g., any computer process that cannot fail during normal business hours. Exemplary mission critical environments may include business-essential process control, finance, health, safety and security. These environments typically monitor, store, support, and communicate data that cannot be lost or corrupted without compromising their core function.

One exemplary environment where fault tolerance is desirable is in financial markets, and in particular, electronic financial exchanges, such as a futures exchange, such as the Chicago Mercantile Exchange Inc. (CME). Consistent reliable operation is important for ensuring market stability, reliability, and acceptance. Fault tolerance typically describes a computer system or component designed so that, in the event that a component fails, a backup component or procedure can take its place with substantially little or no loss of service. Fault tolerance may be provided with software, hardware, or some combination thereof. For example, in a software implementation, the operating system may provide an interface that allows a programmer to "checkpoint" critical data at pre-determined points within a transaction. In a hardware implementation, the programmer may not need to be aware of the fault tolerant capabilities of the machine. For example, at a hardware level, fault tolerance may be achieved by duplexing each hardware component, e.g., disks are mirrored, multiple processors are "lockstepped" together, and their outputs are compared for correctness, etc. When an anomaly occurs, the faulty component is determined and taken out of service, but the machine continues to function as usual.

The level of fault tolerance that is required is typically defined by the needs of the system requirements, i.e., specifications that state acceptable behavior upon error. For example, system requirements may specify whether errors should be detected and corrected or merely detected, and how quickly such actions must be taken.

One method of providing fault tolerance to a system is to add redundancy to one or more of the critical components of the system. Redundancy describes computer or network system components, such as fans, hard disk drives, servers, operating systems, switches, and/or telecommunication links that are installed to back up primary resources in case primary resources fail. Redundancy schemes include:

A one-for-N (1:N) redundancy scheme includes one standby component for every N active component.

A one-for-one (1:1) redundancy scheme includes a standby component for each active component.

A one-plus-one (1+1) redundancy scheme is similar to the one-for-one scheme except that in the case of one-plus-one, traffic is transmitted simultaneously on both active and standby components, where the traffic on the standby is generally ignored. An example of one-plus-one redundancy is the 1+1 SONET/SDH APS scheme that avoids loss of data traffic caused by link failure.

When providing redundant operation for processing components, voting logic may be used to compare the results of the redundant logic and choose which component is correct. For example, in triple mode redundancy, three redundant components may be provided wherein if the result of one component fails to match the other two, which match each other, the ultimate result will be that of the two components that matched.

A well-known example of a redundant system is the redundant array of independent disks ("RAID"), which involves of storing the same data in different places (thus, redundantly) on multiple hard disks. By placing data on multiple disks, I/O (input/output) operations can overlap in a balanced way, improving performance. Since multiple disks increase the mean time between failures (MTBF), storing data redundantly also increases fault tolerance. A RAID appears to the operating system to be a single logical hard disk. RAID employs the technique of disk striping, which involves partitioning each drive's storage space into units ranging from a sector (e.g., 512 bytes) up to several megabytes. The stripes of all the disks are interleaved and addressed in order. In a single-user system where large records (such as medical or other scientific images) are stored, the stripes are typically set up to be small (perhaps 512 bytes) so that a single record spans all disks and can be accessed quickly by reading all disks at the same time. In a multi-user system, better performance requires establishing a stripe wide enough to hold the typical or maximum size record. This allows overlapped disk I/O across drives.

There are several types of RAID systems:

RAID-0 has striping but no redundancy of data. It offers very good performance but no fault tolerance.

RAID-1 is also known as disk mirroring and consists of at least two drives that duplicate the storage of data. There is no striping. Read performance is improved since either disk can be read at the same time. Write performance is the same as for single disk storage. RAID-1 provides high performance and very good fault tolerance in a multi-user system.

RAID-2 uses striping across disks with some disks storing error checking and correcting (ECC) information. It has no advantage over RAID-3, discussed next.

RAID-3 uses striping and dedicates one drive to storing parity information. The embedded error checking (ECC) information is used to detect errors. Data recovery is accomplished by calculating the exclusive OR (XOR) of the information recorded on the other drives. Since an I/O operation addresses all drives at the same time, RAID-3 cannot overlap I/O. For this reason, RAID-3 may be best applied in single-user systems with long record applications.

RAID-4 uses large stripes and allows reading records from any single drive and the use of overlapped I/O for read operations. Since all write operations have to update the parity drive, no I/O overlapping is possible. RAID-4 offers no advantage over RAID-5, discussed next.

RAID-5 includes a rotating parity array, thus addressing the write limitation in RAID-4. Thus, all read and write operations can be overlapped. RAID-5 stores parity information but not redundant data (but parity information can be used to reconstruct data). RAID-5 requires at least three and usually five disks for the array, and is most useful in multi-user systems in which performance is not critical or which perform few write operations.

RAID-6 is similar to RAID-5 but includes a second parity scheme that is distributed across different drives and thus offers extremely high fault and drive failure tolerance.

RAID-7 includes a real-time embedded operating system as a controller, caching via a high-speed bus, and other characteristics of a stand-alone computer.

RAID-10 is the result of combining RAID-0 and RAID-1 and offers higher performance than RAID-1 but at a much higher cost. There are two subtypes, RAID-0+1 and RAID-1+0. In RAID-0+1, data is organized as stripes across multiple disks, and then the striped disk sets are mirrored. In RAID-1+0, the data is mirrored and the mirrors are striped.

RAID-50 (or RAID-5+0) consists of a series of RAID-5 groups and striped in RAID-0 fashion to improve RAID-5 performance without reducing data protection.

RAID-53 (or RAID-5+3) uses striping (in RAID-0 style) for RAID-3's virtual disk blocks. This offers higher performance than RAID-3 but at much higher cost.

RAID-S (also known as Parity RAID) is an alternate, proprietary method for striped parity RAID from EMC Symmetrix and includes a high-speed disk cache on the disk array.

Similar to RAID, RAIN (also called channel bonding, redundant array of independent nodes, reliable array of independent nodes, or random array of independent nodes) is a cluster of nodes connected in a network topology with multiple interfaces and redundant storage. RAIN is used to increase fault tolerance. It is an implementation of RAID across nodes instead of across disk arrays. RAIN can provide fully automated data recovery in a local area network (LAN) or wide area network (WAN) even if multiple nodes fail. A browser-based, centralized, secure management interface facilitates monitoring and configuration from a single location. There is no limit to the number of nodes that can exist in a RAIN cluster. New nodes can be added, and maintenance conducted, without incurring network downtime. RAIN originated in a research project for computing in outer space at the California Institute of Technology (Caltech), the Jet Propulsion Laboratory (JPL), and the Defense Advanced Research Projects Agency (DARPA) in the United States. The researchers involved were researching distributed computing models for data storage that could be built using off-the-shelf components.

The idea for RAIN may be rooted in RAID technology. RAID partitions data among a set of hard drives in a single system. RAIN partitions storage space across multiple nodes in a network. Partitioning of storage is called disk striping.

In databases and processing systems, especially stateful processing systems which store or accumulate state as they continue to process or transact, redundancy presents additional complications of ensuring that the redundant component is synchronized with the primary component so as to be ready to take over should the primary component fail.

A hot standby is a mechanism which supports non-disruptive failover of a database server system, thus maintaining system availability. It provides a desired service via a second server system that is ready to take over if the main system becomes unavailable. The hot standby replication scheme includes a primary server and a secondary backup server. The hot standby configuration provides a way for a secondary database to automatically maintain a mirror image of the primary database. The secondary database on the secondary server is usually of read-only type and it is logically identical to the primary database on the primary server. In case a failure occurs in the primary server, the secondary server can take over and assume the role of a new primary server.

There are several methods for achieving high availability in computer systems that contain databases. One known way to carry out continuous hot standby is to mirror the entire system, i.e., all applications and their associated databases. All operations are performed on both applications of the system, and the applications write each transaction to their respective databases. To ensure that the applications and their databases are synchronized, a mechanism called application checkpointing is typically used. After an operation is executed, each application ensures that the other application has executed the same operation. In other words, the secondary database in association with the secondary application precisely mirrors the primary database and application. Application level mirroring is a good choice for real-time applications where everything, including the application processes, should be fault tolerant.

In one example of checkpointing, a primary process may perform operations and periodically synchronize with a backup process using checkpointing techniques. With certain checkpointing techniques, the primary sends messages that contain information about changes in the state of the primary process to the backup process. Immediately after each checkpoint, the primary and backup processes are in the same state.

In other checkpointing methods, distinctions between operations that change state (such as write operations) and operations that do not change the state (such as read operations) are not made, and all operations are checkpointed to the backup process.

In certain checkpointing systems and methods, a primary receives a message, processes the message, and produces data. The produced data is stored in the primary's data space, thereby changing the primary's data space. The change in the primary's data space causes a checkpointing operation of the data space to be made available to the backup. Thus, there is frequent copying of the primary's data space to the backup's data space, which may use a significant amount of time and memory for transferring the state of the primary to the backup. It may also result in the interruption of service upon failure of the primary. The overhead for such checkpointing methods can have considerable performance penalties.

Other systems and methods attempt to update only portions of the state of the primary that has changed since the previous update, but use complex memory and data management schemes. In certain systems, the primary and backup, which run on top of a fault tolerant runtime support layer (that is, an interface between the application program and operating system), are resident in memory and accessible by both the primary and backup central processing units (CPUs) used in the fault tolerant model. The primary and backup processes include the same code and perform the same calculations.

Yet other checkpointing systems and methods are configured such that if there is a failure of a primary process, the backup process can take over without interruption. In addition, upgrades to different versions of software or equipment can take place without interruption. Some methods are lightweight in that they allow checkpointing of only external requests or messages that change the state of the service instance, thereby reducing the overhead and performance penalties.

For example, a computing system may provide a mechanism for checkpointing in a fault tolerant service. The service is made fault tolerant by using a process pair. The primary process performs operations officially, while one or more backup processes provide a logical equivalent that can be used in the event of failure. The primary and backup are allowed to be logically equivalent at any given point in time, but may be internally different physically or in their implementation.

Application checkpointing is a difficult task to implement and may thus require a significant amount of work from the application programmers. For example, another method for processing hot standby replication operations is to create a transaction log of the operations of a transaction run in the primary server. This log is a record of all data items that have been inserted, deleted or updated as a result of processing and manipulation of the data within the transaction. This log is then transferred to the secondary server and is run serially on the secondary server.

In some cases, data is written to both primary and secondary databases before it can be committed in either of the databases. This ensures that data is safely stored in the secondary server before the primary server sends acknowledgement of a successful commit to the client application. In one such system, a primary mirror daemon on a local computer system monitors the writelog device (redundant data storage or memory device) for data updates and feeds the data over a network in the same order in which it is stored to a receiving remote mirror daemon on a remote computer system, which in turns commits the data updates to a mirror device. In a situation of a failure recovery, these primary and secondary mirror daemons transfer the log to the secondary node where the log is run just as it was in the primary node. The replicated operations are run serially in the secondary node, which may slow down processing speed and reduce overall performance.

Still another mechanism for achieving database fault tolerance is to connect an application to two databases. Whenever the application executes an application function, it commits the related data changes to both servers. To ensure that the transaction is committed in both databases, the application typically uses a so-called two-phase commit protocol to ensure the success of the transaction in both databases. If the transaction fails in either of the databases, it should also fail in the other databases. A two-phase commit protocol is implemented in the application, making the application code more complex. Moreover, distributed transactions are a common reason for performance problems, because a transaction cannot be completed until both databases acknowledge a transaction commit. In this scenario, recovery from error situations can also be very difficult.

Still another way for processing hot standby replication operations is to copy the transaction rows to the secondary node after they have been committed on the primary node. This method is a mere copying procedure where transactions are run serially in the secondary node. This method is known as asynchronous data replication. This method is not always suitable for real-time database mirroring because all transactions of the primary database may not yet be executed in the secondary database when failing over from a primary to a secondary.

Many database servers are able to execute concurrent transactions in parallel in an efficient manner. For example, a server may execute different transactions on different processors of a multi-processor computer. In this way, the processing power of the database server can be scaled up by adding processors to the computer. Moreover, parallel execution of transactions avoids a blocking effect of serially executed long-running transactions, such as creating an index to a large table. To ensure integrity of the database, some concurrency control method, such as locking or data versioning, may be used to manage access to data that is shared between transactions. If two transactions try to obtain write access to the same data item simultaneously while versioning concurrency control is in use, the server may return a "concurrency conflict" error to one of the transactions, and the application may then attempt to execute the transaction at a later time. If locking concurrency control is in use, the server makes one of the transactions wait until the locked resources are released. However, in this scenario it is possible that a deadlock condition occurs, where two transactions lock resources from each other, and one of the transactions must be killed to clear the deadlock condition. The application that attempted to execute the killed transaction must handle the error, e.g., by re-attempting execution of the transaction.

These concurrency control methods may be suitable for use in the primary server of the hot standby database configuration to manage concurrent online transactions of client applications, but may not be applied in the secondary server of the system. Concurrency conflict errors cannot be properly handled, and thus cannot be allowed, in a secondary server. Without a proper hot standby concurrency control method, replicated hot standby operations are run substantially in a serial form in the secondary node. Because operations cannot be executed in parallel, it is difficult to improve a secondary server's performance without raising problems in data integrity and transaction consistency.

As noted above, fault tolerance systems may be implemented in a financial instrument trading system. A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

Current financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

As can be seen, the use of dedicated backup components for fault tolerance can require complex logic to ensure that backup components are synchronized with primary components, so that a backup component is ready to take over should a primary component fail. Moreover, the use of dedicated backup components results in additional costs due to the extra hardware required. Additionally, a large class of failures could result in both the primary and the backup machines failing. However, if a backup component is removed to free up or reduce the number of resources utilized in a system, the overall system loses some amount of processing power, and so the hardware that is implemented must be more efficiently used. If fault tolerance is still desired, then the removal of dedicated backup components also requires efficiently and accurately determining which machines should provide fault tolerance at what times, and for which applications.

Some fault tolerance systems redistribute jobs to other components or other resources based on the number of jobs being handled by the other resources. For example, the Apache Samza framework includes Apache Hadoop YARN, which can be implemented on a cluster of machines. Samza may include tasks and containers that handle the tasks. In Samza/Hadoop YARN, tasks from a failed machine in a cluster are migrated to another machine. However, Samza does not check or consider a current load of its containers before selecting a container for failover services. Samza monitors container resource usage (e.g., CPU, memory, disk, network) but does not account for fluctuating loads of containers. In financial applications, it may be important to assign failed or orphaned jobs to machines that can handle the additional workload. Selecting the right machine can impact overall system latency and resource allocation.

Even fault tolerance systems designed for long running tasks, like Apache YARN, require that all jobs of a task run in containers of a fixed size. YARN containers, which hold the Samza jobs, have fixed resources (e.g., memory and CPU cores). Apache YARN fails to dynamically allocate jobs based on a fluctuating job load. Thus, resources are not shared efficiently. Instead, the load may be assumed to be predetermined and/or fixed.

DETAILED DESCRIPTION

Figure 1:
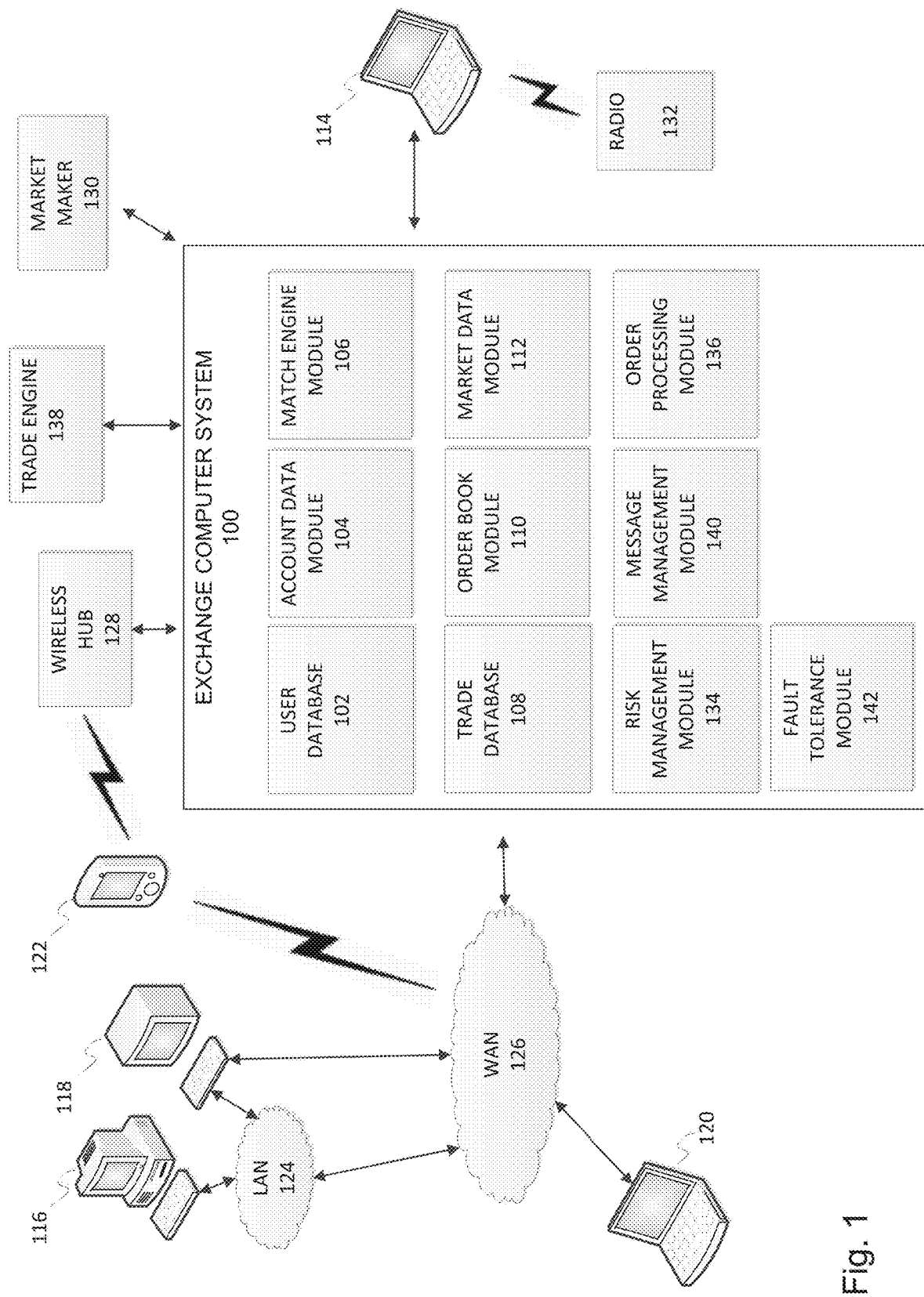
FIG. 1 depicts an illustrative computer network system that may be used to implement aspects of the disclosed embodiments.

The disclosed embodiments relate generally to applications used to implement electronic marketplaces, the management thereof, as well as the data generated thereby or stored therein. Specifically, the disclosed embodiments provide for particular configurations and methods of fault tolerance systems for applications and components, such as applications and components used to implement electronic marketplaces. As such, the disclosed embodiments may be used to efficiently and accurately provide backup services in the event of failure or non-responsiveness of a primary application. The disclosed systems provide fault tolerance using limited resources that can still ensure that a service or application remains available despite some system or component failure In the disclosed fault tolerance system, the processing of jobs, where the requisite amount of necessary processing capacity varies with each job, is apportioned among a plurality of processing instances, wherein the processing load of any one failing instance may be re-apportioned among one or more of the remaining operational instances based on the available processing capacity thereof and the requisite capacity needed to process those job which were being handled by the failed instance, referred to as orphaned jobs. Accordingly, as opposed to providing redundant resources to cover potential failures, which may go unused or unneeded if there are no failures, along with the attendant costs thereof, the disclosed system maximizes the utilization of all available resources to process jobs and reallocates processing responsibilities in the event of a failed resource to one or more of the remaining operational resources based on the available processing capacity thereof and the requisite capacity needed to process those jobs which were previously being handled by the failed resources and now need to be reallocated.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participant are met, e.g., that transactional integrity and predictable system responses are maintained.

Electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

The disclosed embodiments recognize that electronic messages such as incoming messages from market participants, e.g., trade order messages, etc., are sent from market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

Accordingly, an acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP" or Market By Order "MBO" format). It should be appreciated that additional conditions may be specified, such as a time or price limit, which may cause the order to be dropped or otherwise canceled and that such an event may result in another non-market-impacting communication instead. As will be described below, in some implementations, market impacting communications may be communicated separately from non-market impacting communications, such as via a separate communications channel or feed.

It should be further appreciated that various types of market data feeds may be provided which reflect different markets or aspects thereof. Market participants may then, for example, subscribe to receive those feeds of interest to them. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order or MBO feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain its own copy and apply the change reflected in the message to know the current state. As can be seen, MBO messages carry much more data because they reflect any market impacting change. Furthermore, because specific orders, but not the submitting traders thereof, are identified, other market participants may be able to follow that order as it progresses through the market, e.g., as it is modified, canceled, traded, etc.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. As such, MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancelation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

Furthermore, each participating trader receives a notification that their particular order has traded. Continuing with the example, this may require sending 5001 individual trade notification messages, or even over 10,000 messages where each contributing side (buy vs. sell) is separately reported, in addition to the notification sent to all of the market participants.

As detailed in U.S. patent application Ser. No. 14/100,788, the entirety of which is incorporated by reference herein, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

While the disclosed embodiments will be discussed with respect to an MBP market data feed, it should be appreciated that the disclosed embodiments may also be applicable to an MBO market data feed.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades. A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by the order book module 110 and/or match engine module 106. A message management module 140 may be included to, among other things, receive, and extract orders from, electronic messages as is indicated with one or more aspects of the disclosed embodiments. It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, the fault tolerance module 142, or other component of the exchange computer system 100.

In an embodiment, the message management module 140, as coupled with the order book module 110, may be configured for receiving a plurality of electronic messages, each of the plurality of messages having an associated action to be executed within a designated period of time having a beginning time and an ending time, wherein at least one electronic message of the plurality of electronic messages comprises data representative of a particular time between the beginning and end of the period of time at which the action associated with the at least one electronic message is to be executed. The exchange computer system 100 may then be further configured to execute the action associated with the at least one temporally specific message at the particular time.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

One skilled in the art will appreciate that one or more modules described herein may be implemented using, among other things, a tangible computer-readable medium comprising computer-executable instructions (e.g., executable software code). Alternatively, modules may be implemented as software code, firmware code, hardware, and/or a combination of the aforementioned. For example the modules may be embodied as part of an exchange 100 for financial instruments.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

As was described above, the users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may include computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for assigning orphaned jobs to surviving instances based on job loads and/or aggregate instance loads as described herein.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the exchange computer system 100 further includes a message management module 140 which may implement, in conjunction with the market data module 112, the disclosed mechanisms for managing electronic messages containing financial data sent between an exchange and a plurality of market participants, or vice versa. However, as was discussed above, the disclosed mechanisms may be implemented at any logical and/or physical point(s) through which the relevant message traffic, and responses thereto, flows or is otherwise accessible, including one or more gateway devices, modems, the computers or terminals of one or more traders, etc.

Figure 2:
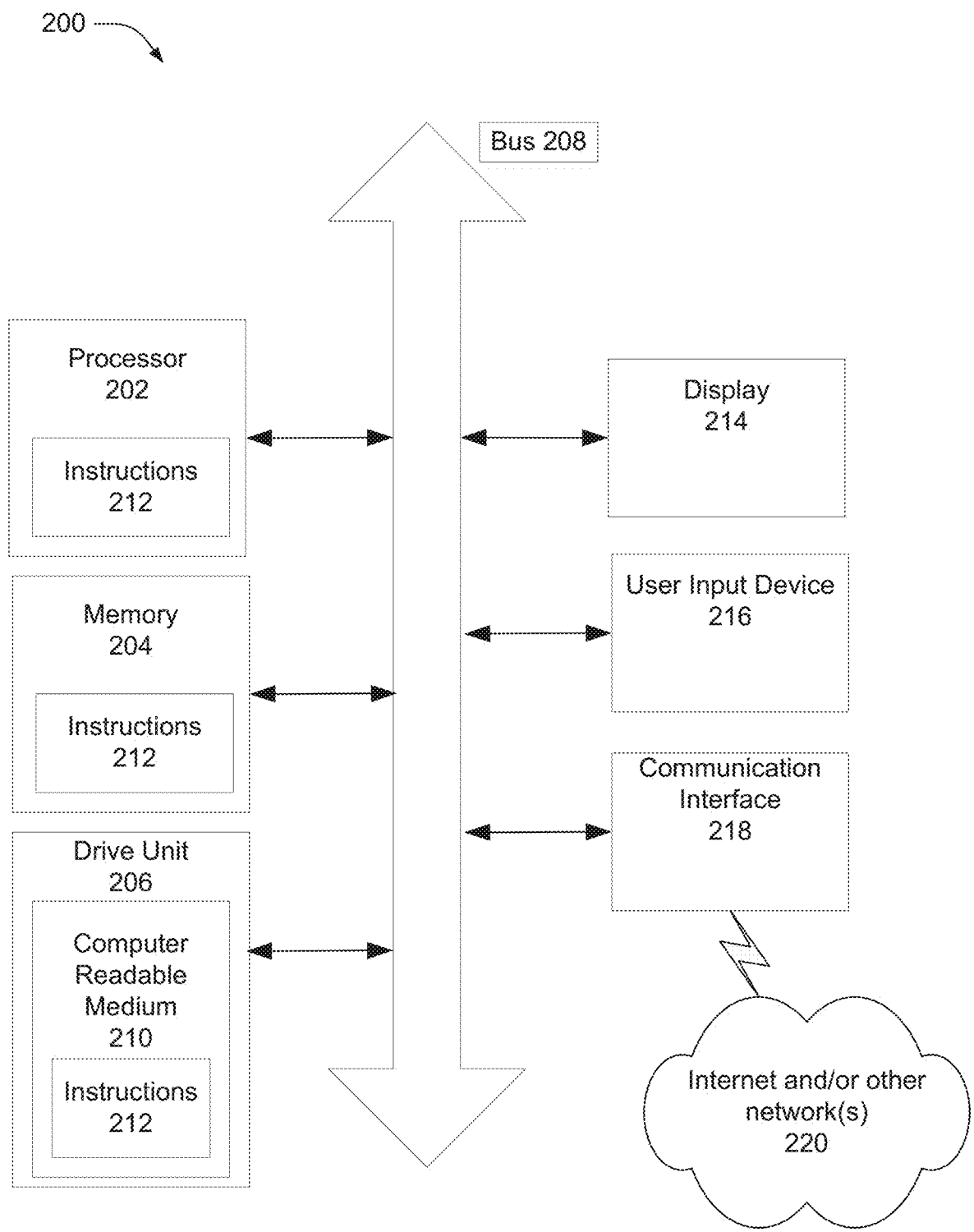
FIG. 2 depicts an illustrative embodiment of a general computer system that may be used to implement aspects of the disclosed embodiments.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may implement a match engine, margin processing, payment or clearing function on behalf of an exchange, such as the CME, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. A computer generally includes a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for user interaction as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a LAN and a WAN, e.g., the Internet.

The computing system can include clients and servers. A client and server are generally remote from each other and typically interact through a communication network. The relationship of client and server arises by virtue of computer programs running on the respective computers and having a client-server relationship to each other.

Figure 3:
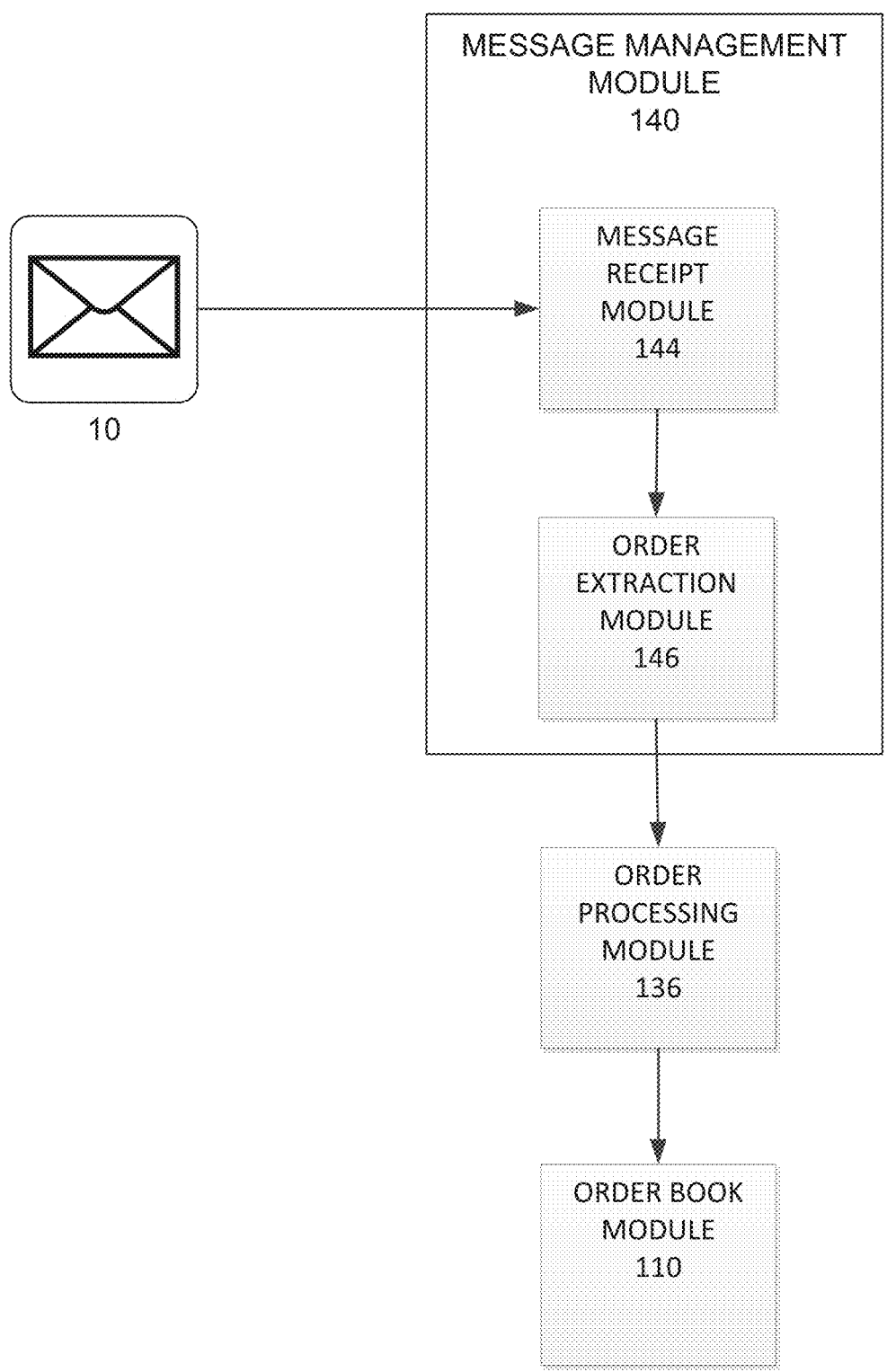
FIG. 3 depicts an example market order message management system that may be used to implement aspects of the disclosed embodiments.

FIG. 3 illustrates an embodiment of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 136 may be configured in various arrangements, and may be configured as part of the order book module 110, part of the message management module 140, or as an independent functioning module.

The embodiments described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entirety. Further, the disclosed message management system may be implemented using an open message standard implementation, such as FIX or FIX/FAST, or by an exchange-provided API.

In an embodiment a plurality of electronic messages is received from the network. The plurality of electronic message packets may be received at a network interface for the electronic trading system. The plurality of electronic messages may be sent from market participants. The plurality of messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, the market may operate using characteristics that involve collecting orders over a period of time, such as a batch auction market. In such an embodiment, the period of time may be considered an order accumulation period. The period of time may involve a beginning time and an ending time, with orders placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an embodiment, the other data may be data indicating a particular time in which the action is to be executed. As such, the order may be considered a temporally specific order. The particular time in which an action is undertaken may be established with respect to any measure of absolute or relative time. In an embodiment, the time in which an action is undertaken may be established with reference to the beginning time of the time period or ending time of the time period in a batch auction embodiment. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an embodiment, the electronic message may also include other actions to be taken with respect to the order. These other actions may be actions to be executed after the initial or primary action associated with the order. For example, the actions may involve modifying or canceling an already placed order. Further, in an embodiment, the other data may indicate order modification characteristics. For example, the other data may include a price or volume change in an order. The other actions may involve modifying the already placed order to align with the order modification characteristics, such as changing the price or volume of the already placed order.

In an embodiment, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

In an embodiment, the action, or a primary action, associated with an order may be executed. For example, an order extracted from electronic message order characteristics may be placed into a market, or an electronic order book for a market, such that the order may be matched with other order counter thereto.

In an embodiment involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an embodiment, the action may be executed at the particular time. For example, in an embodiment involving a batch auction process having sub-periods during an order accumulation period, an order may be placed during a specified sub-period of the order accumulation period. The disclosed embodiments may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an embodiment, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In an embodiment, the execution of temporally specific messages may be controlled by the electronic trading system such that a limited or maximum number may be executed in any particular accumulation period, or sub-period. In an embodiment, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In an embodiment, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an embodiment involving a market operating on batch auction principles, the event may be detected subsequent to the execution of a first action, placing an order, but prior to the ending time of an order accumulation period in which the action was executed.

In an embodiment, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an embodiment, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described above with respect to FIG. 2. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Further, when a transaction is determined to be an order to buy or sell a financial product, or financial instrument, a quality of activity as related to the market participant associated with the order may be calculated. The quality may be calculated as a specific value indicative of such quality, or a quality value. A value indicative of a quality of market activity may be considered a value that indicates whether the market activity of the market participant is conducive to improving market liquidity. As such, a quality value may be indicative of previously received transactions from the market participant having increased a probability that the processor will successfully match a subsequently received incoming order to buy or sell the associated financial instrument with at least one other received but unsatisfied order for a transaction counter thereto for the associated financial instrument, to at least partially satisfy one or both of the incoming order or the at least one other received order. Further, the value may be calculated based on the price of the incoming order, previously stored quantities, previously stored data indicative of previously received orders to modify or cancel, and previously stored data indicative of a result of attempts to match previously received orders stored in association with the market participant.

A quality value may be considered a market quality index ("MQI"), indicative of the market participant's quality of market activity. As such, particular categories of market activity may be quantified as a particular score for respective particular categories. Further, the scores of each, or selected, particular categories of market activity may be summed or added together to calculate the quality value or MQI. In an embodiment, the scores for the particular categories may be determined as percentile scores for a market participant in the particular category, as compared with other or all market participants in the electronic market. Further, particular category scores may be determined using data limited to transactions received over a particular length of time, or a most recent number of received transactions. Also, the particular length of time may be a most recent length of time, and as such a rolling window of time indicative of recent market activity of the market participant.

One of the particular categories may be a price proximity category. A proximity category may involve a proximity score indicating a proximity of the received order price to a midpoint of a current price spread of currently unmatched orders. A price spread may be any type of price spread or range or available prices for the product of the electronic market. For example, a price spread may be a difference between a highest price associated with a buy order and a lowest price associated with a sell order. Further, a proximity may be determined using any technique. In an embodiment, a raw difference between the received order price and an average price of the price spread (i.e., bid-ask spread) may be used. For example, a bid-ask spread may be $93.00-$94.00 in a market. As such, the midpoint may be $93.50. An order to buy may then be placed into the market at $92.00, having a corresponding proximity to the midpoint of 1.5. Similarly, an order to buy may be placed in the market at $94.00, which provides a 0.5 proximity to midpoint. Further, the proximity to midpoint may include designations of over/under midpoint values. For example, prices for orders to buy may have a proximity to midpoint defined as the bid-ask spread minus the price, providing values of 1.5 and −0.5 respectively for the examples above. Similarly, offers to sell may have a proximity to midpoint determined as the offer price minus the midpoint, thus providing inverted designations from the offers to buy. Other statistical proximity indicators, such as a standard deviation, or variance, as compared with other open or unmatched orders in the electronic market may also be used.

Another particular category may be an order size category. Larger quantities may be more desirable for liquidity generation than smaller quantities, and as such a market may encourage larger orders by quantifying historical order sizes of market participants in the order size category. The size category may involve a size score indicative of an average quantity of previously received orders from the market participant determined using the previously stored quantities. The average may be determined using any technique, such as a statistical mean or arithmetic average.

Another particular category may be a matched order volume category. A market may consider a number of previously matched orders by a market participant an indicator of a willingness or propensity to trade. As such, the matched order volume may involve a volume score indicative of a number of matched previously received orders from the market participant determined using previously stored data indicative of a result of attempts to match previously received orders stored in association with the market participant.

Yet another particular category may be an order modification category. Market activity characterized by rapid entry and subsequent cancelation or modification of orders that may move an offer to buy to a lower price, or an offer to sell to a higher price, may be considered not conducive to market liquidity. As such, an order modification category may involve a modification score indicative of a frequency of order modifications or cancelations of the market participant determined using the previously stored data indicative of previously received orders to modify or cancel from the market participant. It may be noted that as orders may be modified multiple times, a measure of the number of modifications on a percentage of total orders by a market participant may be above 100%, or generally a larger number than the maximum total number of orders provided to the market by the market participant.

In an embodiment, the particular categories may be weighted by designated weighting factors prior to the summing. In such an embodiment, the calculation of the quality value, or MQI, may be characterized by Equation 1.

$$V = (W_P \times S_P) + (W_S \times S_S) + (W_V \times S_V) + (W_M \times S_M)$$ Equation 1:

In Equation 1, V is the value, $S_P$ is the proximity score, $W_P$ is the weighting factor for the proximity score, $S_S$ is the size score, $W_S$ is the weighting factor for the size score, $S_V$ is the volume score, $W_V$ is the weighting factor for the volume score, $S_M$ is the modification score, $W_M$ is the weighting factor for the modification score. The weighting factors may be provided by any weighting technique. For example, each of the weighting factors may be an allocated value, wherein all the weighting factors added together equal 100% of a total value. In an embodiment, each of the scored values may receive equal weighting, such as 25%. For example, if an order with an associated market participant receives a proximity score of 50, a size score of 70, a volume score of 60 and a modification score of 35, a corresponding calculated MQI may be 53.75 when the weighting factors are equalized at 0.25. Note, that in such an embodiment, total MQI scores will vary between 0 and 100. As such, with lower category scores indicating better market activity characteristics, 0 may represent the minimum, or best possible, score, whereas 100 may represent the maximum, or worst possible, score.

In an embodiment, each score may be determined as a percentile comparative to other market participants. For example, if there are 100 market participants and a particular market participant has a proximity score that ranks that market participant as having the $40^{th}$ best proximity score raw value, such a participant may be considered in the $60^{th}$ percentile, and receive a 60 value as a proximity score. In an alternative embodiment, the same market participant may receive a 40 value as a proximity score. As understood by those with experience in the art, a selection of whether a lower number or a higher number score is favorable may be determinative of how percentile scores are awarded or otherwise calculated.

An electronic market may then attempt to match the incoming order to buy or sell with an appropriate counter order to buy or sell. As such, the electronic market may generate and/or execute trades of financial products between market participants. Further, the attempts to match may be enhanced by providing that some orders to buy or sell in the electronic market are given priority in matching over other orders in the electronic market. As such, an identical order to buy or sell, i.e., an identical volume at an identical price, may be differentiated based on assigned priorities such that the order of the identical orders having a higher priority is matched prior to the order having a lower priority. Priorities may be determined using various techniques. In an embodiment, orders may be assigned priority deterministically, that is orders may be assigned priority based on when an order was placed in an electronic market, such that orders placed earlier may have higher priorities. Another technique for determining a priority for an order may be based on the quality value or MQI of an order. For example, orders having a better MQI, i.e., a smaller value, may be filled or otherwise selected for matching over and/or prior to orders having a worse MQI, i.e., a larger value.

In an embodiment involving a market operating using batch auction principles, orders to buy or sell a product of a market may be accumulated over a period of time, such as one minute. At the end of the accumulation period, attempts to match the accumulated orders are made. A matching process for a batch order market may involve filing accumulated orders at a singular price. For example, accumulated counter orders may be overlaid using a supply curve based on the prices and quantities of accumulated orders. As such, matches may be made using an intersect of the two, i.e., buy and sell, supply and demand curves as a singular price, or also known as an equilibrium price, for matching counter orders. Contrarily, when there is no price intersect of the supply and demand curves, no trades may be executed. Generally, when a price intersect is determined, more orders meet the matching price criteria on one curve than the other curve, and thus some number of matchable orders may not have corresponding counter orders, and consequentially may not be matched. Priority of orders may be used to determine which matchable orders are actually matched at the end of the order accumulation period in the electronic market. For example, orders having a better MQI score or value may be selected for matching over orders having a worse MQI score.

An MQI score may be used for purposes aside from matching trades. For example, an MQI score may be determined using characteristics specific to a particular market participant, such as an MQI involving just size, volume, and modification scores as indicated above. Such other uses may include any other use for a value indicative of a market participant's propensity for improving market liquidity.

In an embodiment, an MQI value may be used to determine market message throttling in an electronic market. While electronic trading systems may be capable of processing millions, or even billions, of incoming and outgoing messages during a typical trading day, capacity for message management, and ultimately order management, is not unlimited. As a result, an electronic market may adopt a practice of formally or informally limiting, or throttling, the magnitude of message traffic initiated by market participants. This throttling may be applied in light of the informally perceived significance of a market participant's activities for an electronic marketplace. An MQI value may be utilized to guide such throttling decisions such that the allowed magnitude of message traffic becomes a function of a market participant's MQI value.

In an embodiment, an MQI value may be used to establish a fee structure for the participation in a market of market participants. Exchanges may establish a fee structure that preferences certain market participants. As such, a fee structure may be established based on MQI values for market participants, so that better MQI values correlate to lower fees for the associated market participant.

In an embodiment, an MQI may be used to determine a focus for marketing or sales activities of a market exchange administrator. Marketing and/or sales activities are frequently focused on market participants of greater perceived importance. Reference to an MQI of a market participant may be used to determine such marketing or sales activity focus.

Data indicative of attempts to match incoming order may also be saved. The data may be stored in any device, or using any technique, operable to store and provide recovery of data. For example, a memory 204 or computer readable medium 210, may be used to store data, as is described above with respect to FIG. 2.

The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 710, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a low priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower. As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transaction from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

It should be appreciated that the plurality of entities utilizing the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

In one embodiment, an exchange system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple MSGs, one for each market/product implemented thereby. For more detail on deterministic operation in a trading system, see U.S. patent application Ser. No. 14/074,667 entitled "TRANSACTIONALLY DETERMINISTIC HIGH SPEED FINANCIAL EXCHANGE HAVING IMPROVED, EFFICIENCY, COMMUNICATION, CUSTOMIZATION, PERFORMANCE, ACCESS, TRADING OPPORTUNITIES, CREDIT CONTROLS, AND FAULT TOLERANCE" and filed on Nov. 7, 2013, herein incorporated by reference.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request is passed to the transaction processing system, e.g., the match engine.

In one embodiment, if a participant wishes to modify a previously sent request, e.g., a prior order which has not yet been processed or traded, they may send a request message comprising a request to modify the prior request.

In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

In one exemplary embodiment, the incoming request itself, e.g., the inbound order entry, may be referred to as an iLink message. iLink is a bidirectional communications/message protocol/message format implemented by the CME.

As should be appreciated, the presently disclosed embodiments can be implemented to provide fault tolerance to one or more applications. The presently disclosed methods and systems may be used by financial computer systems, such as a futures exchange such as the CME. The disclosed fault tolerant systems and methods can operate without a centralized managing computational service or dedicated backup machines.

As disclosed herein, an application is a set of hardware, software, or a combination thereof that may be configured to perform a set of specific and related tasks. For example, in the context of a financial exchange, an application may be a match engine or trade engine application.

An application, which may be implemented in software, can be installed, executed, copied or run on multiple machines. When an application is copied to a specific memory location or otherwise execution thereof by a processor commences, the copy may be referred to as an instance of the application. Thus, "instance" may refer to a copy of an application that is installed, executed, copied or run, such as on a specific memory location. Each unique copy, installation, or execution of an application may be referred to as an instance of the application. For example, an application running on a machine may be referred to as an instance of that application.

A group of machines all having or running the same application can be said to be having or running multiple instances of that application. An application may even be executing in multiple instances on the same machine. Each unique execution of an application may be referred to as an instance.

For example, Microsoft Word® is an application. A first computer executing or running Microsoft Word® may be said to be running a first instance of Microsoft Word®. A second computer may run a second instance of the same application, namely, Microsoft Word®. The two instances may be processing different jobs, e.g., the first instance may be used to view a letter, and the second instance may be used to edit or print a memorandum. The instances are different and are performing different tasks, but are related because both are instances of the same application.

An instance of an application may be tasked with running or performing a job. A job may be defined as a reasonable, logical, unit of work defined by users of the system and implemented, e.g., in code. For example, a job could be defined as listening to an engine's output. Or, a job could be listening to a single instrument group. Or, a job could be listening to a group of low volume instrument groups.

Each instance may be responsible for one or more jobs. Or, an instance may be responsible for no jobs and may serve as a buffer if there is a system failure, as discussed below. In one embodiment, a job may be to listen to information from a portion of a system and based on that information, produce an output for another system or another portion of that system to consume.

Each job is associated with a load, which reflects how computationally intensive that job is for a computer system or machine. The load may fluctuate from very high (e.g., full capacity) to very low (e.g., idle) within the same job. Each instance has an aggregate "load" which may be the sum of all the loads of jobs run or performed by that instance. In one embodiment, the aggregate load may include other loads or overheads associated with running that instance's jobs. For example, an aggregate load may include overhead associated with running jobs where no one job is directly responsible for the load associated with the overhead.

The load of a job may increase as the job requires more computational resources. For example, if an instance's job is to listen to the output of a system, then as the output of the system increases (e.g., due to increased system activity), the load of that job will also increase. The aggregate load of an instance can increase if either the load of a job assigned to that instance increases, or if the instance is assigned additional jobs.

Jobs may be portable, so that they may be transferred from one machine to another and/or from one instance to another. Upon a failure in the system, some jobs may be reassigned, because the instance that was running those jobs is no longer available. Such jobs that need to be reassigned may be referred to as orphaned jobs. An orphaned job may be defined as a job that is not being run by or assigned to any functioning or operational instance. A failed job in one embodiment may be referred to as an orphaned job. As discussed in further detail below, the presently disclosed embodiments consider the load of an orphaned job and/or the loads being handled by one or more of the remaining/surviving instances before assigning that orphaned job to a surviving instance.

The disclosed fault tolerance system in one embodiment provides fault tolerance to an exchange match engine without requiring dedicated backup or redundant hardware or software. Instead, multiple instances of an application, where the instances are running different jobs, can serve as backups to each other if needed, and otherwise contribute to the processing of the overall workload of the system when not needed as a backup, thereby maximizing resource utilization. Although the instances may run independently of each other, they may also share state information with all other instances. When a failure occurs, the shared state information may be used, as will be further described below, by at least a subset of the remaining operational instances during a recovery process. Each instance may be able to access a common persistent data store, and store small quantities of state information about the instance as a whole in the persistent data store. The state of each instance may be visible and accessible to all, or a subset thereof, other instances. This state information may include all information necessary for any other instance to determine if that instance is the best candidate to receive a job orphaned by a failed instance.

Instances may be allowed to specify their own recovery logic. In one embodiment, all surviving instances are notified of some other instance failing, and are able to choose to receive the jobs that are orphaned. Alternatively, only a subset of surviving instances may be notified. In one embodiment, when there is an orphaned job, instances independently decide if they should take a job based on which instance currently has the lowest load. The lowest load instance may take ownership of the largest load orphaned job.

In other cases, all the instances independently decide which instance should take the load based on available workload capacity. Available workload capacity, or available capacity, may be a reflection of an instance's ability to perform specific jobs.

Additionally, instances may "forfeit", or willingly give up, a job so another instance can take that job. This job may also be considered an orphaned job, because it is not assigned or tasked to a specific instance. An instance may forfeit a job when that instance has a heavy aggregate load. For example, when the load on an instance is greater than two or three times its typical load, the instance may forfeit a job that may be considered small to another instance. Another instance would then accept that job.

When a forfeit occurs, the system may block additional forfeits globally for a time limit to provide protection against races or cascades. A cascading failure describes a condition where instances that recover orphaned jobs themselves fail (due to the additional load they have taken on), which causes more orphaned jobs. When other instances take on those orphaned jobs, those instances also fail. The end result may be that there are no surviving instances in the cluster.

A race condition occurs when two instances both attempt to pick up the same orphaned job at the same time. A race condition can also occur when a first instance forfeits a job because that first instance's capacity has been exceeded, a second instance picks up that forfeited job but forfeits a job because that second instance's capacity has been exceeded, a third instance picks up that forfeited job but forfeits a job because that third instance's capacity has been exceeded, and so on until the cluster of instances is endlessly forfeiting and picking up jobs.

The disclosed fault tolerance system accordingly can, in one embodiment, better utilize system resources by load balancing among instances, either in the case of failures or voluntary forfeits.

The jobs described herein may be long-running jobs. Many load balancing systems can only operate on short-lived, atomic tasks. For example, load balancing systems that can only operate on short-lived, atomic tasks may allocate work at the initiation of a job. Once work or a job is initiated, such load balancing systems cannot move the work around to other resources without restarting the job.

The disclosed fault tolerance system can handle jobs that are long running tasks, and can balance the load on each instance during runtime. Even typical fault tolerance systems that are designed for long running tasks do not attempt to balance the load on each instance during runtime. Indeed, most fault tolerance systems do not differentiate between a job (logical unit of work) and an instance (a process running multiple jobs).

In one embodiment, long-term jobs may be defined to include services which must be active during a company's business hours and are continuously receiving new and similar units of work. For example, listening to the output of an engine for a week at a time may be an example of a long-term job.

In one embodiment, short-term jobs are jobs that process a fixed unit of work and then complete after processing the fixed unit of work. For example, determining whether a number is a prime number is a short-term job.

An instance may require a set of resources, such as a processor and one or more special registers, to perform a given job. An instance may process one or more jobs logically related to an application. One instance may perform all the jobs of an application. Or, multiple instances may perform the jobs of an application. Typically, an instance will run on one machine. If one of the instances on a machine fails, other machines can start the jobs previously assigned to the failed instance.

It should be appreciated that the relationship between applications, jobs, instances and machines may vary depending on the implementation selected by engineers. For example, an application may include multiple jobs requiring multiple instances. Or, an application may only run or perform one job, which in turn may only need one instance. Or, an application only having one job may still need multiple instances to process. Those multiple instances, in turn, may be run on multiple machines. Alternatively, an application may be running hundreds of jobs simultaneously, and the number of instances needed for each job varies and fluctuates depending on the state of the environment, e.g., the exchange system. In many cases, such as the some of the exemplary cases described below, an instance is responsible for multiple jobs. In each of these cases, it should be appreciated that the disclosed embodiments provide for fault tolerance if any one of the applications, jobs, instances, or machines fails or is disconnected or otherwise terminated, either on purpose or through some system failure.

Thus, in one embodiment, each of the jobs that needs assignment to a working instance may be considered to be the result of a terminating event. The terminating event may be a machine or instance failure, or the terminating event may be a user action that intentionally terminates a job or machine or instance.

The machines discussed herein may be physical or virtual machines. As understood in the art, a virtual machine emulates the computer operating system, architecture or functions of a physical machine.

In case of failure of one of the instances, different instances may pick up the jobs that were being handled by the failed instance. The instances can run independently of one another, but share their states with all of the other instances. Or, the states might be shared with a synchronization device, discussed below. The saved state information can be used to recover a failed instance or failed job. Thus, the fault tolerance system may be implemented in a clustered environment including multiple machines or instances that can efficiently serve as backups to one another.

Each instance may calculate and store a list of jobs being handled by that instance. A job may be defined as a task without a defined end. For example, in the context of a financial exchange computer system, a job can be defined as listening to an engine's output indefinitely. Or, a job can be defined as listening to the outputs of a single instrument group. Additionally, jobs as disclosed herein may be long-running and are not limited to small, atomic tasks.

Each instance may also calculate a load for each of its jobs. As used herein, a load of a job represents the computational resources needed to process that job. Each instance, or the fault tolerance system itself, may calculate a job load as the amount of memory, throughput (e.g., messages/second), or CPU usage a job requires. The job load thus quantifies or attempts to quantify the computational resources a job is expected to require.

In one embodiment, the job load may be calculated in real time, and reflect the current computation resources it is using. Or, a job load may be an expected value based on historical data. For example, based on historical data, it may be reliably assumed that a match engine application receives 50 messages a second when a specific market opens. The fault tolerance system may assign a job load based on that expected value. Or, the fault tolerance system may calculate in real time a job load for each job. The job load may be calculated during that job's execution by an instance or machine. While a real time job load calculation will be more accurate than an expected value or assumption, the increase in accuracy may not make up for the resources that are used to calculate that real time job load. Thus, whether the fault tolerance system uses an actual job load or an expected job load may be implementation dependent.

In one embodiment, the job load may be configured or entered manually, e.g., by a user of a system. For example, if a job type is consistently observed to have a certain job load, then the system may be configured to assume that jobs of that job type would have a certain predetermined job load. This would allow the system to have access to a job load value without having to calculate or determine the job load for a job, saving time and resources. In one embodiment, the job loads for various types are predetermined before a specific job even begins.

It should be appreciated that the job load may be custom-defined per application. For example, for some instances or environments, the fault tolerance system may look at the number of messages being processed by each job. In others, it may be more useful to look at the total number of messages in the job queue. In one embodiment, the load may be calculated as CPU usage, calculated throughput (messages/second), network utilization memory footprint, or any combination thereof. Any metric that defines a physical limitation of a machine may be used to calculate a load.

The job load accordingly may be any metric that can be measured to indicate the current workload that a job represents. As long as two job loads are measured or indicated via the same metric or variable or unit, the two job loads can be meaningfully compared. For example, if an instance is running two jobs, the job loads for both may be defined as how many seconds a job requires to complete a specific task. The two job loads may be 5 seconds and 5 minutes for the two jobs. In that example, the system would determine that the job load of the job requiring 5 seconds is the lesser of the two job loads. Thus, the system was able to meaningfully compare the two job loads because they were using the same unit.

Each instance may also calculate its aggregate load by summing, for example, the individual job loads. An aggregate load of an instance may be the sum of the loads of all the jobs being handled by that instance. The aggregate load may additionally include overhead load not attributable to a single job.

A system may include multiple instances, which together may be viewed or referred to as an instance cluster. If the multiple instances are run on multiple machines, the cluster may also be referred to as a machine cluster. In one embodiment, the fault tolerance system calculates and tracks the current job load for each job in each instance in the clustered environment.

The instances can share load data, e.g., job loads or aggregate loads, or any internal state, with each other. The instances may share this information by communicating with each other, or may store this in common location, such as a synchronization device discussed below. Each instance can be configured to access the individual job loads as well as the aggregate loads of the other instances. It should be appreciated that the cluster of instances or machines should use the same schema, variables, metric, unit, or syntax to calculate the load, as with the job load. In this way, the load between different instances or machines can be compared and it can be determined which machine has, for example, the highest load.

Each of the multiple machines or applications may be logically assigned to a group of related primary machines or applications. In one embodiment, the disclosed embodiments may be used for fault tolerance for applications supporting match engines.

Because the machines or instances in a given cluster are handling related applications, the machines or instances in a cluster may be similarly configured. For example, all of the machines in a cluster may share the same code base, run the same operating system, or include the same software. This allows the machines to be interchangeable and allows any one of the machines to perform any of the jobs assigned to any of the other machines. All the code needed to execute any of the jobs being handled by a machine in the cluster is present or accessible to any of the other machines in the cluster. All the machines in the cluster need the same software resources.

The exchange system may include multiple, e.g., nineteen, match engines corresponding to nineteen market segments. In one embodiment, each market segment that is traded in the electronic marketplace may have a corresponding match engine. Each match engine in turn may be coupled to a market data generator that generates market data for the corresponding market segment. In particular, the market data generator parses or listens to outputs from the match engine and prepares the market data for publishing. The market data generator thus may be one of many applications or machines implemented in software and/or hardware in the exchange system. The market data generators collectively may be viewed as a cluster of related applications or machines performing similar tasks.

Another example application or machine implemented in the exchange system is a trade match report generator. A trade match report generator may listen to match engine activity and report relevant activity to a clearinghouse. The trade match report generator may be responsible for parsing and grouping match engine outputs into trade match reports for that match engine (and thus, for the associated market segment).

It should be appreciated that although the jobs being handled by a cluster may be related in one sense to each other, they need not be the same job. For example, a job handled by one machine in a cluster may listen to market data output from a match engine to produce a public market data feed. Another job handled by a different machine in the cluster may listen to fill messages output from a match engine to create clearing messages. Thus, the jobs are different but are still related in the sense that they listen to outputs from the same match engine. In this case, if one of the machines fails, the fault tolerance system may prefer to assign the failed machine's job to the machine that is listening to the same engine as the failed job. This would reduce the overall load on the cluster because one machine would now be listening to the outputs (e.g., market data outputs and fill messages outputs) from the same match engine.

In one embodiment, the fault tolerance system may assign a load discount or a load penalty in determining a job's overall job load. For example, in the example discussed above, the fault tolerance system may assign a load discount to an orphaned job when evaluating whether that job should be assigned to a surviving instance that runs on the same machine as the job before the job was orphaned. Using a load discount, the fault tolerance system may assign an orphaned job to a surviving instance that is handling similar jobs as the orphaned jobs, or is already listening to the same machine required to be listened to by the orphaned job. Using a load discount or load penalty system may thus increase fault tolerance assignment efficiencies by giving a preference to instances that are performing jobs similar to the orphaned job.

A developer or user of the financial exchange may be able to configure when the fault tolerance system assigns a load discount or a load penalty. For example, an instance that is already performing jobs that are similar in nature to an orphaned job may apply a load discount for the orphaned job, whereas an instance that is performing completely different jobs than the orphaned job may apply a load penalty to the orphaned job. An example scenario when the fault tolerance system may assign a load discount or penalty is by considering whether the orphaned job and the surviving instances that could accept and perform the orphaned job are connected to the same match engine, for example. Thus, the load discount or penalty depends on both the orphaned job as well as the surviving instance that is considering whether that orphaned job should be accepted. In other words, each surviving instance associates a load discount or penalty with each orphaned job that is being considered by that surviving instance.

Another example when the fault tolerance system may assign a load discount is when the machine running an orphaned job before the job was orphaned and the machine running a surviving instance are the same machine.

In one embodiment, the fault tolerance system is connected to a synchronization device that records and stores information or state about all of the instances of the market data generators. The synchronization device stores for example the list of current jobs for each instance, the job load for each job, and the aggregate load for each instance. In one embodiment, the state information stored by the synchronization device may be accessed by one or all of the surviving instances during a recovery process. In one embodiment, the clustered machines collectively function as both the synchronization and storage device.

Figure 4:
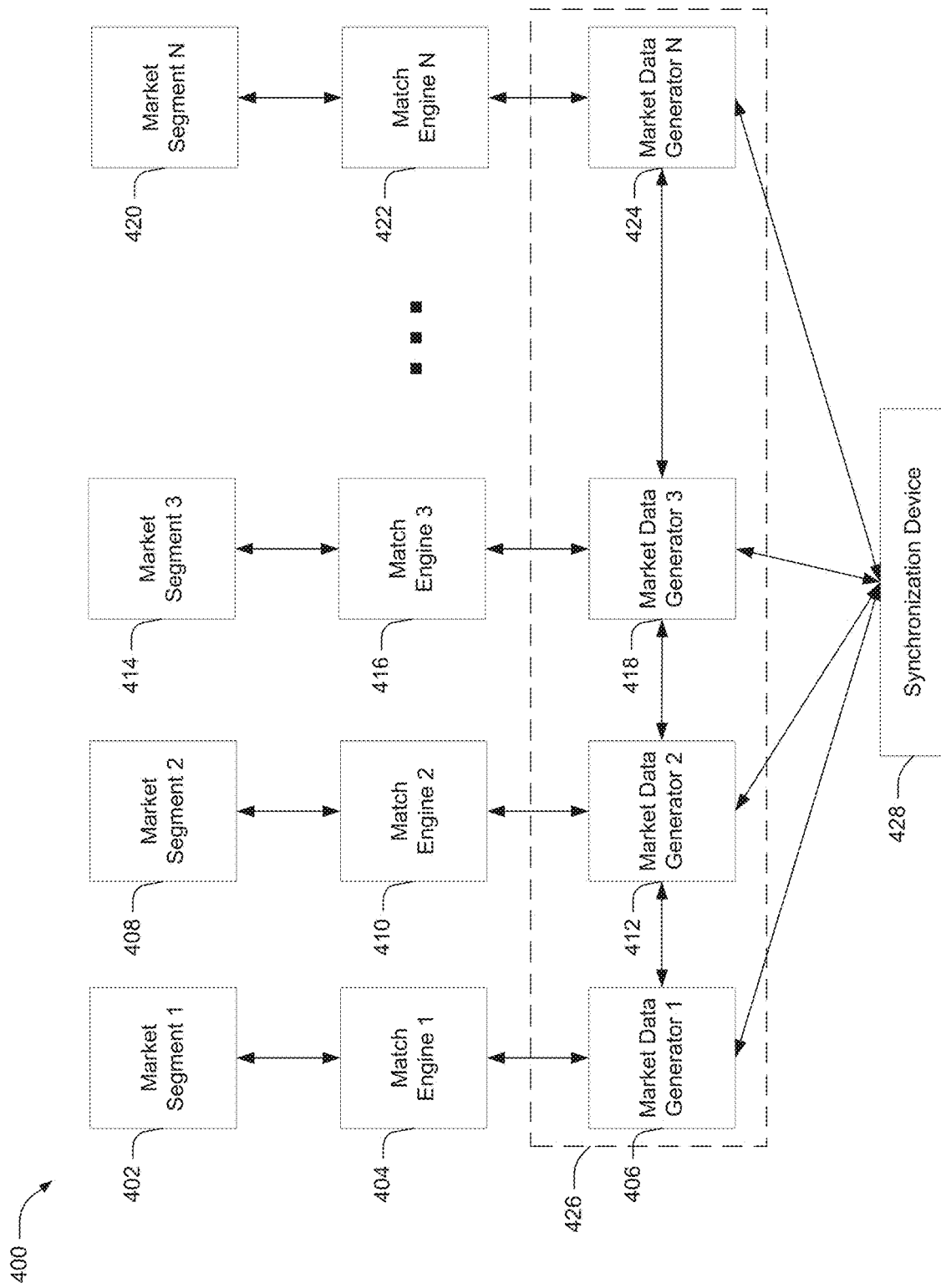
FIG. 4 depicts an example system running multiple applications on multiple machines, according to one example embodiment.

FIG. 4 discloses an example system 400 including multiple market segments 402, 408, 414, and 420. Each of market segments 402, 408, 414, and 420 is associated with a match engine 404, 410, 416, and 422 respectively that matches orders or trades for its respective market segment 402, 408, 414, and 420. Each match engine 404, 410, 416, and 422 in turn is associated with an application, such as market data generator 406, 412, 418, and 424, respectively, each of which is an instance of a market data generator as described herein. The market data generators 406, 412, 418, and 424 generate market data that can be published to market participants via one or more market data feeds (not shown), and are thus similar or related instances of applications.

In one embodiment, the market data generators are initially configured to be associated with one match engine. Thus, each instance initially is assigned to the jobs associated with a single match engine, e.g., listening to the output of a single match engine. However, the market data generators may provide failover or fault tolerance to each other, so that upon a failure of one of the market data generators, another instance of the market data generator application cluster can take over the failed market data generator's jobs. Market data generators 406, 412, 418 and 424 can communicate with each other, although match engines 404, 410, 416, and 422 may not communicate with each other.

Market data generators 406, 412, 418 and 424 may each be considered a match engine application that runs on a separate machine. The instances 406, 412, 418 and 424 performing similar, related tasks may be considered a cluster 426 that includes failover and fault tolerance capability. The instances operating in a cluster 426 may generate and save state information describing their operations. The instances each share their state information with the other instances, either directly with one another, using an external data store, or through the use of a synchronization device. If a failure occurs, the shared state information is used by the surviving instances during a recovery processes. Thus the disclosed fault tolerance system may be implemented across multiple related instances.

System 400 may also include a synchronization device 428. The synchronization device 428 can be used, for example, to receive both job and instance data from the instances or machines 406, 412, 418 and 424. The synchronization device 428 can also optionally be used to store recovery data. The synchronization device 428 can also be used, for example, to transmit information about job or instance failures to the surviving instances. In certain embodiments, the synchronization device 428 can maintain lists of failed instances or jobs and notify surviving instances of a failure. In one embodiment, the synchronization device 428 can include software and/or hardware that maintains an active list of running instances and their associated jobs. The list of running jobs and instances can be updated to reflect failed jobs or instances. For example, the listing of living or surviving jobs and instances can be updated when an instance in the cluster disconnects from the application, times out, or is manually deleted from the list of active instances. In other embodiments, the synchronization device 428 is optional and the instances or associated machines 406, 412, 418 and 424 themselves can store load data and/or recovery data locally. Whether the job and instance modules are stored remotely or locally, each instance in cluster 426 should be configured to have access to the job data modules and instance data modules associated with any other instance in the cluster.

Figure 5:
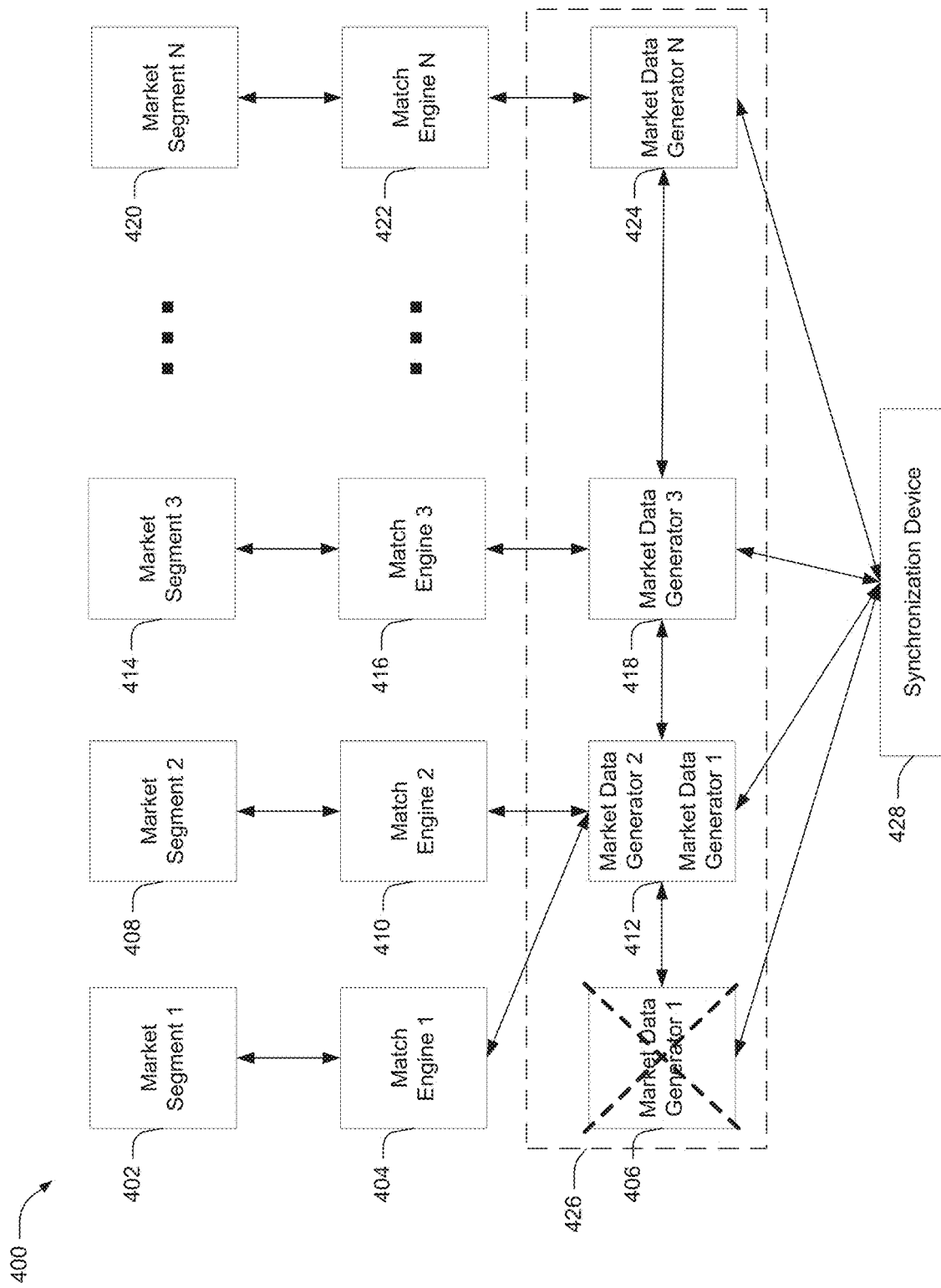
FIG. 5 depicts another example system running multiple applications on multiple machines, according to one example embodiment.

Upon a failure of one of the machines, another machine takes over for the failed machine. For example, as illustrated in FIG. 5, upon a failure of machine 406 running the application or instance for market data generator 1, the fault tolerance system configures machine 412 to run the application or instance for market data generators 1 and 2. Any matches or outputs from machine 404 are now monitored and parsed by machine 412. Machine 412 thus becomes responsible for the outputs related to both match engines 1 and 2. The logic and mechanisms for determining that jobs orphaned by machine or instance 406 should all be assigned to machine or instance 412 are discussed in further detail below.

Moreover, as discussed below in connection with FIGS. 7 to 10, the different jobs that are orphaned by the failure of machine 406 may be tasked to different machines, so the entire market data generator application 1 may not be ported over to machine 412.

Figure 6:
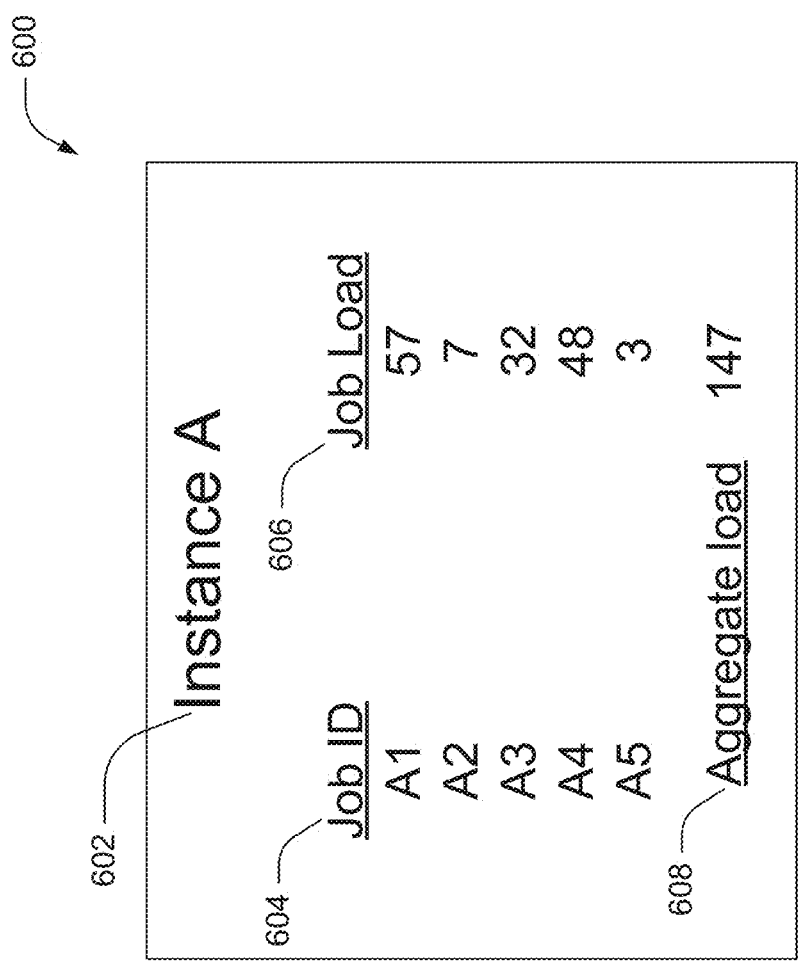
FIG. 6 depicts an example data structure for an instance that may be used to implement aspects of the disclosed embodiments.

FIG. 6 illustrates an example data structure 600 for an example instance 602. Data structure 600 includes a job identification 604 and a load 606 for each job being processed by instance 602. In particular, data structure 600 stores information about job IDs A1 having load 57, A2 having load 7, A3 having load 32, A4 having load 48, and A5 having load 3. Data structure 600 also stores an aggregate load 608 of 147 for instance 602, which is the sum of the loads for each job in the instance, namely, 57+7+32+48+3.

In one embodiment, the data structure for an instance may also include recovery data (not shown in FIG. 6). While data structure 600 is illustrated as including both instance and job data, the instance data and the job data may be stored in separate data structures. Alternatively, recovery data for all instances may be stored in the synchronization device.

In certain embodiments, data structure 600 also includes additional data that may be used by an instance in case a job associated with data structure 600 fails. This data may include, for example, a message describing job operations, or a job snapshot. Data structure 600 may be persistent and can be recovered even if instance A that generated the data structure 600 fails. In certain embodiments, the data structure may be serialized Java objects. In other embodiments, other data structures (e.g., JSON strings, SBEs, etc.) can be used instead. In one embodiment, the recovery data used to recover a job, and the rest of the job information itself, may be stored in separate data structures.

As an instance performs jobs associated with a particular application, the instance may generate and update job data modules describing both its own load and the loads associated with the individual jobs that they are performing. For example, data structure 600 stores and generates recovery data 604 and 606 associated with jobs A1 to A5 as well as the aggregate load 608. As will be described in further detail below, the recovery and load data can be used in case of job or instance failure. Recovery data 604 and 606 is data that may be used for recovery logic. The fault tolerance system may use additional data beyond Job ID 604 and Job Load 606 to determine which instance should receive an orphaned job.

It should be appreciated that the fault tolerance system may be used to back up a variety of applications. For example, in a clustered system or environment including multiple machines that run similar or related tasks, the machines could provide backup or failover services to each other. Thus, even under normal operation, the clustered fault tolerance system only needs the amount of hardware required to run the assigned applications. There is no need for a separate backup machine for each machine that is implemented in the exchange system.

The disclosed systems and methods thus avoid the use of the extra hardware and software resources required to implement systems which require a dedicated backup machine or a centralized computing service. The disclosed systems and methods also conserve network resources by allowing instances to perform multiple jobs instead of requiring a separate process for each job operating on a network. Additionally, the disclosed systems and methods reduce network latency by allowing for efficient recovery from instance and job failures.

For example, an exchange system may include multiple applications and/or hardware components that could be considered important, such that disruption or failure of the application would be detrimental to the business or undesirable. It should be appreciated that the fault tolerance system may be used to back up applications, machines, computers, devices, components, etc. Any software or hardware that is considered important may be backed up using the fault tolerance system of the disclosed embodiments.

Because the fault tolerance system in one embodiment reduces the amount of hardware often required for backup systems, the fault tolerance system may be used for applications that may not typically be backed up. In this regard, the fault tolerance system could be viewed as improving overall system reliability and stability, because it can be used anytime multiple machines are deployed.

As described above, in one embodiment, the exchange system may include multiple match engines, where each match engine corresponds to a market segment. Each match engine may also be coupled to software and/or hardware for reporting or analyzing match engine activities or data. For example, the exchange system may include a market data generator for each match engine. Thus, the exchange system may include multiple market data generators, or a cluster of market data generators. Under normal operation, each instance of the market data generator communicates with its respective match engine.

A market data generator is an example of an application or instance in an exchange system that may be backed up via fault tolerance systems. The disclosed fault tolerance system may also be used to back up the market data generators, so extra backup machines are not necessary. In particular, each market data generator instance or box may listen to or monitor activities related to each of the other market data generators. If one of the machines or instances fails, each of the other machines or instances (i.e., the surviving machines or instances), or a subset thereof, may be configured to detect the failure. If any of the instances of the market data generators fail, the others can step in to provide backup services, as discussed in detail herein.

Upon failure of a machine, the failed machine's pending jobs are considered orphaned jobs. The other machines in the fault tolerance system accept and take responsibility for the orphaned jobs in a specifically defined way. In one embodiment, the fault tolerance system may ensure that the failed instance has not begun to actively process a job before the job is assigned to a surviving instance. As mentioned above, disclosed embodiments allow multiple instances associated with a given application to run separate jobs simultaneously. The instances can each run independently from one another but can also share state information with other instances. As described in more detail below, when a job failure occurs at an instance, the shared state information allows the other instances to accept and recover failed jobs.

In one embodiment, each instance is able to generate and/or store small quantities of state information about the instance as a whole in a persistent data store. This state information is visible to all other instances and includes all information such that, at any time, other instances can decide if they are the best candidate to take an orphaned job. This information may be stored in the synchronization device.

Because the disclosed fault tolerance system does not include a backup machine for each primary machine, it is desirable to efficiently distribute orphaned jobs upon machine failure. Indeed, because the number of machines is not increased, it is critical to efficiently distribute orphaned jobs upon machine failure. Each job must be assigned to the right machine such that the overall system load is efficiently distributed among available resources.

Some fault tolerance systems allocate orphaned jobs to be assigned to other resources based on the number of jobs being handled by the other resources. However, in some applications or environments, the mere existence of a job does not reflect the amount of work required to perform that job, because not all jobs are equally computationally expensive, or have the same load, even if those jobs are performing similar functions. For example, two machines may be available to take over for a failed machine. Each machine may be running only one job, but one of the jobs may be computationally expensive and require many more resources than the other.

The presently disclosed systems account for the fact that some jobs or tasks can idle. It should be appreciated that the instances implemented in an exchange system may process long-standing or long-term jobs. A long-term job may be a job that is intended to fluctuate between periods of high activity and low activity within the job, before that job is killed or ended. Without taking this into account, resources such as surviving instances may not be utilized properly.

It should be appreciated that short-term or short-lived processes may be designed so that an application calling or invoking a short-term process waits for a response from the short-term process before proceeding to the next step. In contrast, an application that creates or invokes a long-term job may not wait for the long-term job to complete before moving on to the next task. Thus, in one embodiment, short-term jobs may be considered to be synchronous, in that the logic calling the job waits for an output or response from the job and closes or ends the job before moving on to the next job. Long-term jobs may be considered asynchronous in that no logic is idly waiting for the long-term job to complete.

Short-term jobs typically have all the input data they need at start. Thus, in one embodiment, no new input data is received by short-term jobs after the job is commenced. Long-term jobs may not have all data needed to perform their tasks when the job begins. Long-term jobs may have to process and collect data after start.

If a short-term job fails before it is completed, the short-term job is typically restarted from the very beginning. Thus, short-term jobs are not partially recovered, but are instead wholly restarted. In contrast, it may not be possible or feasible to restart a long-term from the very beginning. Long-term jobs that fail or are orphaned are instead recovered from the point of failure. Unlike short term jobs, orphaned long-term jobs that are assigned to a surviving instance require resources to be recovered.

Whether a job is short-term or long-term may depend upon the thread that invokes that job, namely, whether the thread that invokes a job requires a response and closes the job before moving onto executing the next part of the thread. In one embodiment, a short-lived job may be executed synchronously within the context of a single server thread.

In one embodiment, match engine market data generators are long-term jobs that continuously listen to match engine outputs as the match engine cycles thorough high and low levels of activity. The match engine does not wait for a response from the market data generators in order to continue matching orders or producing market data outputs. Similarly, market data feeds do not wait for market data generator instances to provide outputs. For example, in a long-term job, a response is not needed for each request sent to the long-term job. And, in a long-term job, multiple requests may be received without the long-term job providing any responses. In other words, in a long-term job, a response to a first request is not needed in order for the long-term job to receive and begin processing a second request.

In one embodiment, a short-term job may be a job that only generates one transaction. Long-term jobs may generate multiple, e.g., hundreds or thousands of transactions. A transaction may be a save event, e.g., saving or writing data to a memory or database. A transaction may also be creating an output in response to an incoming message that is sent to another system, e.g., sending an output message to a component downstream in the system.

In one embodiment, a long-term job may depend on human interactions or delays, or may depend on inputs from non-computers. For example, a long-term job such as a market data generator may listen to the output of a match engine, which in turn process orders submitted by human traders.

In one embodiment, a long-term job may involve interactions, delays, or intermediate messages between system components.

In other embodiments, a long-term job may depend on actions external to the exchange system 100. The long-term job may depend on actions or requests external to the fault tolerance system or cluster. For example, a market data generator fault tolerant cluster may receive inputs from the exchange system, which in turn may receive inputs from computer trading systems external to the financial exchange system 100.

It should be appreciated that because long-term jobs may be designed to be processed over several hours or days, whether or not a job thread exists may not accurately reflect how much work that job actually requires at any given moment. Thus, when a job becomes orphaned, the disclosed fault tolerance system does not, for example, look only at how many jobs have been orphaned by a failed instance, but also considers the current or expected load of orphaned jobs.

For example, each of the market data generator instances may be tasked with the job of monitoring and reviewing the match engine output and generating reports based upon match engine activity. At some points in time, the job may idle due to low match engine activity. At other times, when match engine activity is high, the market data generator instance's job may have an increased load. In one embodiment, all of the market data generators process only one job, namely, monitoring match engine output for market data events, which may be considered a long-term job. In one embodiment the market data generators process multiple long-term jobs.

The synchronization device can be used to determine which of the instances should receive orphaned jobs. In one embodiment, the disclosed fault tolerance system, in connection with the synchronization device, looks to the load of the orphaned job before determining which surviving instance will process the orphaned job. In one embodiment, the disclosed fault tolerance system may additionally look to the aggregate load of each surviving instance to determine which surviving instance should process the orphaned job. Moreover, the fault tolerance system may calculate the aggregate load for each instance after assigning each orphaned job. Thus, the fault tolerance system can quickly and efficiently assign which instance should pick up which orphaned job.

It should be appreciated that upon a failure of any one of the instances, attempting to reallocate jobs based on the number jobs being handled by the surviving instances may not lead to an efficient redistribution of orphaned jobs. In one embodiment, the disclosed fault tolerance system avoids such inefficiencies by looking to the load of each orphaned job and assigning orphaned jobs to surviving instances based on aggregate instance load. As discussed below, the fault tolerance system may alternatively or additionally utilize available computing capacity to determine orphaned job assignment.

In one embodiment, an individual job may fail, but the instance may continue to run, or survive. The instance handling a failed job may attempt to process the job again. If that instance is not able to revive or process that job, the failed job may then be assigned to one of the other instances as discussed herein. It should be appreciated that if an instance fails, then all of the jobs the instance was running may also fail. Jobs may fail for a variety of reasons (e.g., a computer crash, computer memory faults, loss of network connectivity, etc.).

In some implementations, a network administrator or a remote instance may intentionally cancel a job that is currently running, effectively causing the job to fail. The job may be canceled, for example, to load balance network resources or to prevent a job with known issues from causing additional performance issues. In other embodiments, an instance running a job may voluntarily forfeit the job so another instance can accept the job and resume operations instead. This may happen, for example, when the instance that originally runs the job has a heavy load (e.g., two to three times the median load of related instances) and recognizes that other instances are better suited to run the job (e.g., due to lower loads and/or higher available workload capacities at the other instances). In case a job or instance is forfeited, the fault tolerant system may prevent additional jobs or instances from being forfeited globally on the cluster for a designated time period in order to provide protection against races or cascades.

In one embodiment, the exchange system may automatically forfeit a job when an instance reaches a threshold of its available capacity. Or, the exchange system may monitor all the aggregate loads of all the instances. If the aggregate load of any one of the instances passes a predetermined threshold, and other instances are below that threshold, the exchange system may force the instance with the highest or past-threshold aggregate load to forfeit jobs. Thus, the exchange system may rely upon aggregate load of instances and job loads of individual jobs to load balance a cluster.

After an orphaned job is accepted by a surviving instance, the surviving instance can use stored recovery data to start processing the accepted job. For example, the recovery data can optionally include data describing the last successful operation performed by a job before machine or instance failure. The recovery data can also indicate where or how the surviving instance can access messages or job inputs related to the failed job that took place after the failure occurred. The instance can then access and replay these messages to begin the recovery process. In certain embodiments, the recovery data can include or indicate where a snapshot of the job prior to failure can be accessed. Additionally, the instances can be configured to ensure that the instance that was running the job when it failed does not attempt to accept or restart the job.

After an instance determines that it should accept a failed job, the job is recovered. After accepting a failed job, an instance can notify the synchronization device that it has accepted the job so the synchronization device can update its records and data accordingly.

An instance can use recovery data stored in the job data module associated with the failed job to recover the failed job. Because the job data modules as disclosed herein are persistent, they are accessible even if the associated job has failed. In certain embodiments, the recovery data can include data describing where to access new messages sent to the job after the job failed. The instance can then access and replay these messages. The replayed messages can be configured such that they are atomic and have a persistent sequence number such that the instance can process them in the appropriate order. In certain embodiments, the recovery data stored in the job data module may refer to snapshot data of the failed job. The snapshot data may be stored in another computer system or database and be accessed by the instance in order to recover the failed job.

Additionally, because the jobs across instances in a cluster are all related to the same application, when an instance recovers a failed job, it can rely on and access preloaded process data as part of the job recovery process. For example, some applications may share a cache of information needed to perform its jobs. To perform a failed or orphaned job, an instance may rely on data it previously accessed or loaded for other of its jobs. For example, all of the contracts or instruments listed on an exchange may rely on a shared cache of security definitions. Some applications need some or all of those definitions in order to produce the correct output. For example, a job may need security definitions 1 through 10. Thus, the instance running that job loads definitions 1 through 10. If that job fails and is then started on an instance that has loaded definitions 5 through 13, then that instance already has some of the definitions needed for the failed job, namely, 5 through 10. That instance thus only needs to load definitions 1 through 4 to perform the newly accepted orphaned job.

Safeguards may be implemented to prevent another instance from attempting to perform a failed job after the failed job has been accepted by a surviving instance. For example, in certain embodiments, after a job has been accepted by an instance, the synchronization device will update its data to indicate that the previously failed job no longer needs to be accepted by any other instance. Therefore, if a second instance attempts to accept a failed job after it has already been accepted by a first instance, the synchronization device will not allow the second instance computer to access recovery data for the job.

Figure 7:
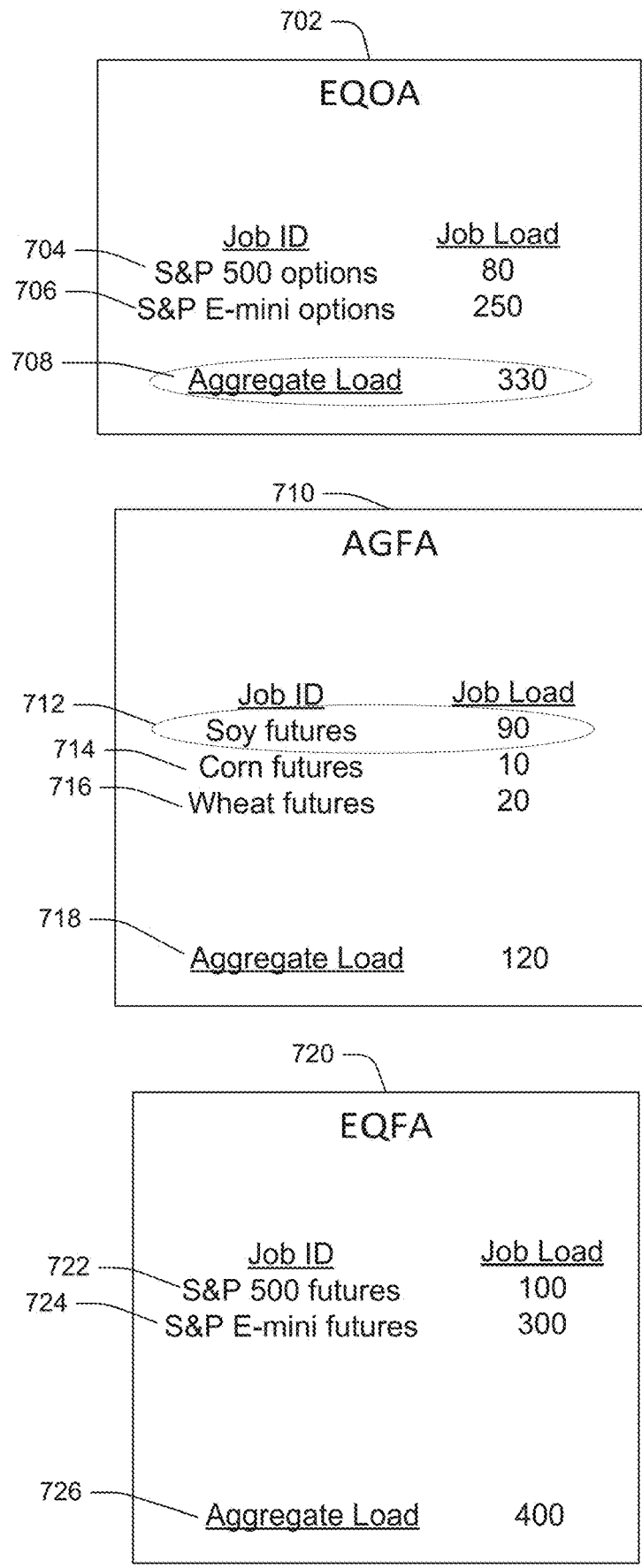
FIG. 7 depicts an example cluster of market data generator instances for an exchange system implementing an example fault tolerance system.

FIG. 7 illustrates an example embodiment of a cluster of market data generator instances 702, 710 and 720. Each market data generator instance is responsible for parsing the outputs from its respective match engine, and preparing or generating market data that can be shared internally or with market participants. Each market data generator may be tasked with some other job related to its respective match engine. However, it should be appreciated that in the example of FIG. 7, each market data generator performs the same task with respect to its match engine. Thus, the market data generator instances are configured in a similar manner and are equipped with the resources (e.g., appropriate hardware and software applications) to, if needed, perform any of the jobs being tasked to any of the other market data generators.

In the illustrated embodiment, market data generator instance 702 corresponds with an Equity Options match engine. Thus, instance 702 includes jobs that are related to Equity Options matches. For example, instance 702 includes job 704, listening to outputs from the Equity Options match engine related to S&P 500 options and job 706, listening to outputs from the Equity Options match engine related to S&P E-mini options. The load of job 704 may be 80, and the load of job 706 may be 250. The load again may be a reflection of how computationally expensive a job is for an instance. The load may be calculated in one embodiment based on criteria specified by a user of exchange system 100. The criteria or variables used to calculate a load may be specified by a user before the disclosed fault tolerance system is implemented in a financial exchange system. Instance 702 also includes an aggregate load 708 indicating the sum of the loads for jobs 704 and 706. The aggregate load 708 thus reflects in one embodiment the total current load being processed by instance 702.

Market data generator instance 710 corresponds to an Agriculture Futures match engine. Instance 710 includes job 712, listening to outputs from the Agriculture Futures match engine relating to Soy futures, job 714, listening to outputs from the Agriculture Futures match engine relating to Corn futures, and job 716, listening to outputs from the Agriculture Futures match engine relating to Wheat futures. The load of job 712 may be 90, the load of job 714 may be 10, and the load of job 716 may be 20. Instance 710 also includes an aggregate load 718 indicating the sum of the loads for jobs 712, 714 and 716.

Market data generator instance 720 corresponds with an Equity Futures match engine. Instance 720 includes job 722, listening to outputs from the Equity Futures match engine relating to S&P 500 futures and job 724, listening to outputs from the Equity Futures match engine relating to S&P E-mini futures. The load of job 722 may be 100 and the load of job 724 may be 300. Instance 720 also includes an aggregate load 726 indicating the sum of the loads for jobs 722 and 724.

If instance 710 should fail, fault tolerance system determines that there are three orphaned jobs, namely, jobs 712, 714 and 716. The fault tolerance system begins a specialized assignment process to determine the assignment schedule for assigning the orphaned jobs to surviving instances 702 and 720.

The fault tolerance system determines that orphaned job 712 (encircled) has the highest load of all the orphaned jobs. Each of the surviving instances determines its aggregate load and determines whether its own aggregate load is the lowest aggregate load of all the surviving instances. Upon a failure of instance 710, the aggregate load 708 of surviving instance 702 is 330 (encircled) and the aggregate load 726 of surviving instance 720 is 400. The fault tolerance system determines that instance 702 should process orphaned job 712, which was determined to be the orphaned job with the highest load of all the orphaned jobs. The fault tolerance system assigns orphaned job 712 to instance 702.

Figure 8:
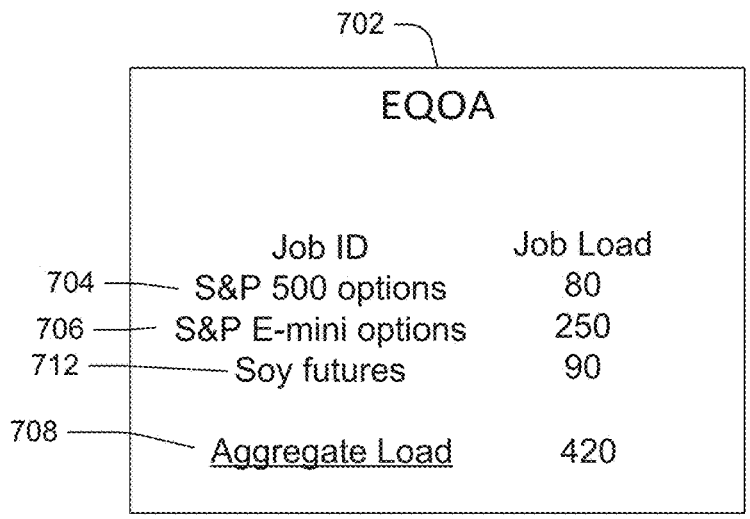
FIG. 8 depicts another example cluster of market data generator instances for an exchange system implementing an example fault tolerance system.
Figure 8:
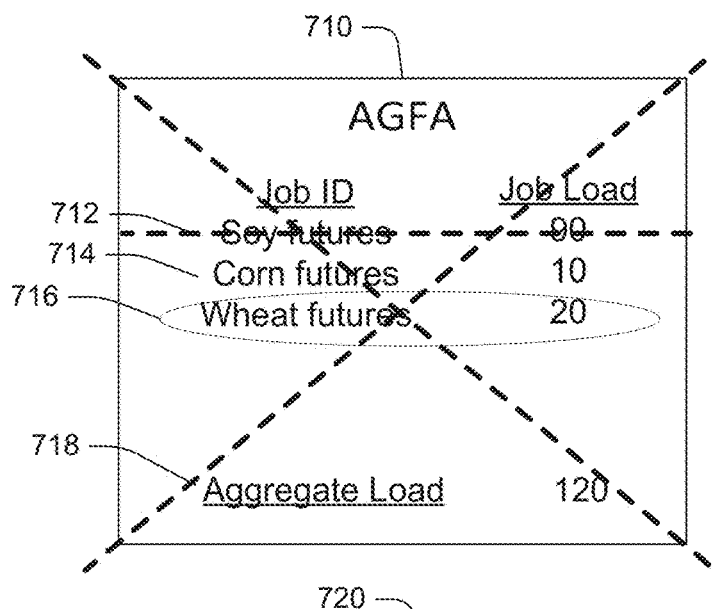
Figure 8:
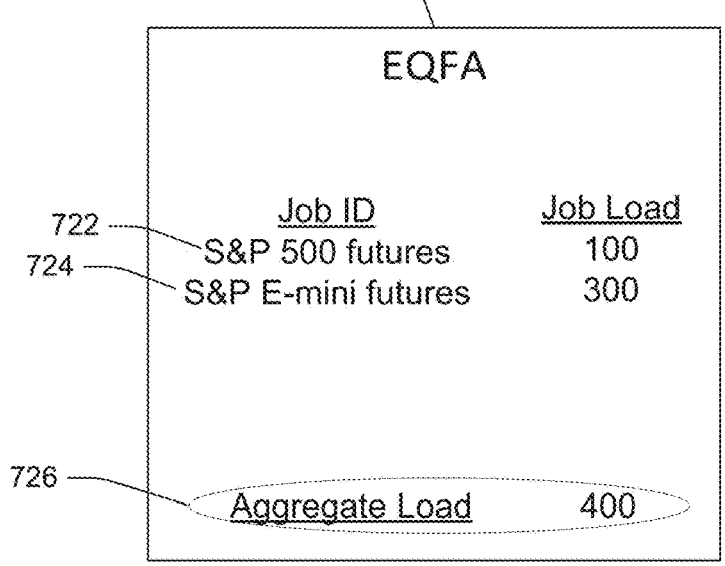

FIG. 8 illustrates the cluster of market data generator instances 702, 710 (which has failed and is crossed out with dashed lines) and 720 after orphaned job 712 (also crossed out with dashed lines) has been assigned to instance 702. The aggregate load 708 for instance 702 becomes 80+250+90=420. The fault tolerance system then checks whether all orphaned jobs of the failed instance 710 have been assigned to a surviving instance.

In the illustrated example, orphaned jobs 714 and 716 still need assignment. The fault tolerance system then assigns the remaining orphaned job with the highest load. In particular, the fault tolerance system determines that job 716 (encircled) should be assigned next because its load of 20 is greater than the load of 10 for job 714. Each of the surviving instances determines its aggregate load and determines whether its own aggregate load is the lowest aggregate load of all the surviving instances. In particular, instance 702 determines that its aggregate load 708 is 420, and instance 720 determines that its aggregate load 726 is 400 (encircled). Thus, the fault tolerance system determines that instance 720 should accept responsibility for and process orphaned job 716.

It should be appreciated that the job loads for jobs in the surviving instances may change while orphaned jobs are being assigned. For example, job loads for jobs 704 and 722 may fluctuate as orphaned jobs 712, 714 and 716 are assigned to instances 702 and 720. The fault tolerance system in one embodiment uses the most currently available data, including updated job loads for jobs assigned to surviving instances.

Figure 9:
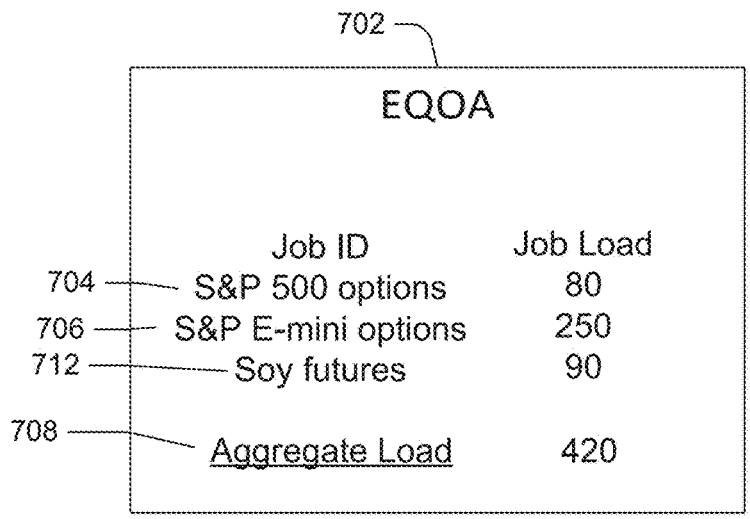
FIG. 9 depicts another example cluster of market data generator instances for an exchange system implementing an example fault tolerance system.
Figure 9:
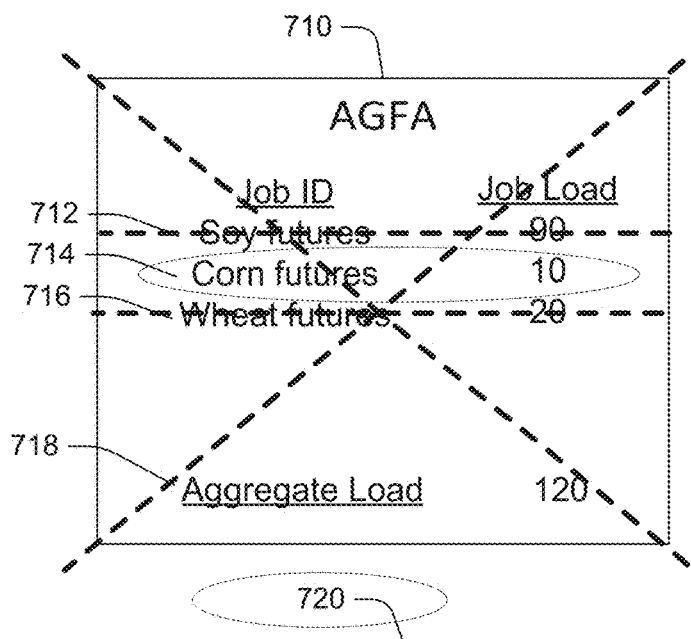
Figure 9:
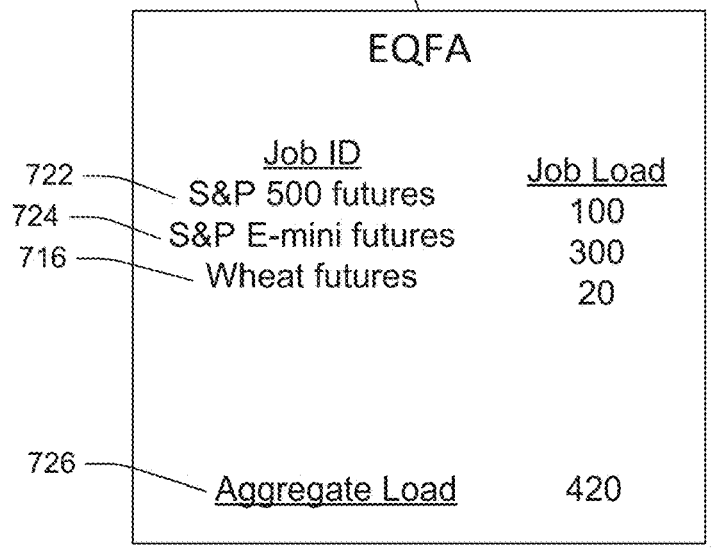

FIG. 9 illustrates the cluster of market data generator instances 702, 710 and 720 after orphaned job 716 has been assigned to instance 720. The aggregate load 726 for instance 720 becomes 100+300+20=420. The fault tolerance system then checks whether all orphaned jobs of the failed instance 710 have been assigned to a surviving instance.

In the illustrated example, orphaned job 714 (encircled) is the only orphaned job remaining that needs assignment. Each of the surviving instances determines its aggregate load and determines whether its own aggregate load is the lowest aggregate load of all the surviving instances. In this illustrated example, surviving instances 702 and 720 have the same aggregate load of 420. In the case of a tie in aggregate load between surviving instances, as in the example of FIG. 9, the fault tolerance system may use a tie breaker field. For example, the fault tolerance system may use alphabetical order of surviving instance names as a tiebreaker between surviving instances having the same aggregate load. The fault tolerance system may also use alphabetical order of orphaned job names as a tiebreaker between orphaned jobs having the same job load. It should be appreciated that the fault tolerance system may only implement or use tiebreaker fields that are unique and non-duplicative. For example, if the names of the instances or jobs are to be used as tiebreaker fields, the exchange system may require that the name field for each instance or job must be unique.

Referring back to FIG. 9, instances 702 and 720 both have the same aggregate load 420. The fault tolerance system thus uses the names of the instances as a tiebreaker field. Instance 720 EQFA alphabetically precedes instance 702 EQOA. The fault tolerance system thus selects instance 720 (encircled) for orphaned job 714.

Figure 10:
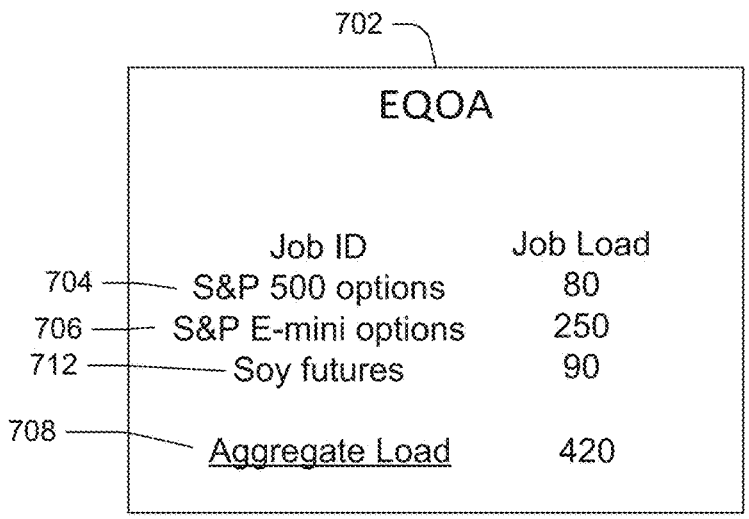
FIG. 10 depicts another example cluster of market data generator instances for an exchange system implementing an example fault tolerance system.
Figure 10:
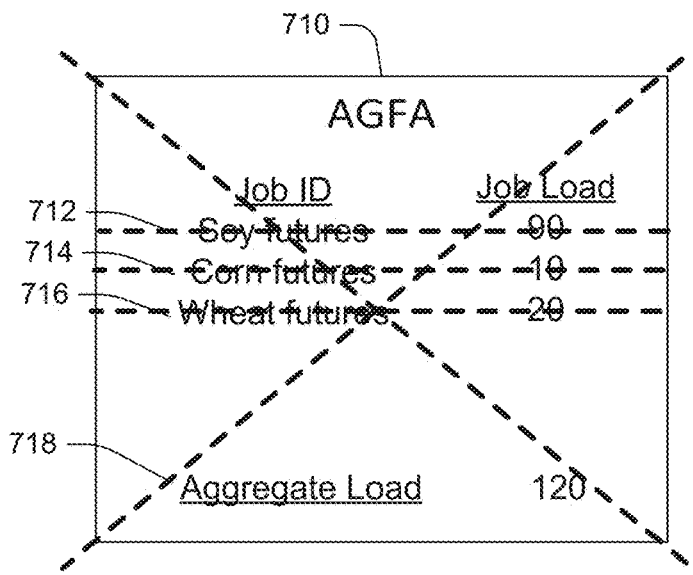
Figure 10:
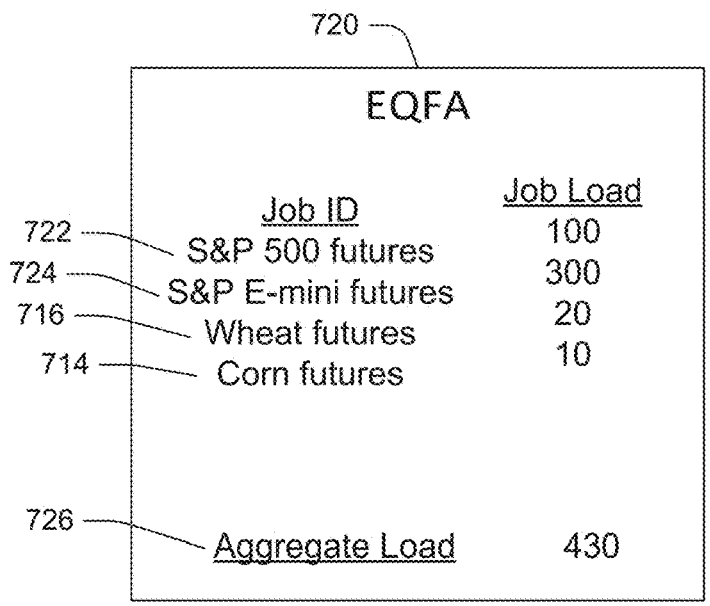

FIG. 10 illustrates the cluster of market data generator instances 702, 710 and 720 after all orphaned jobs have been assigned to a surviving instance. It should thus be appreciated that even though instance 710 has failed, e.g., a machine running market data generator reports for the Agriculture Futures match engine has failed, the fault tolerance system has ensured that no Agriculture Futures match engine jobs are left unprocessed. The exchange system can continue to match Agriculture Futures orders, and its market data generation reports can be prepared by the surviving instances. It should also be appreciated that the fault tolerance system provides backup services for each of the instances without requiring the exchange system to include any additional machines that are not initially used by the system. In other words, adding fault tolerance services as presently disclosed does not significantly increase the overall system's hardware requirements.

It should be appreciated that the fault tolerance system would follow a similar process if only a few of the jobs failed. For example, if instance 710 did not fail, and only jobs 712 and 714 failed, the fault tolerance system would reassign orphaned jobs 712 and 714 to other instances as described above.

Moreover, orphaned jobs are assigned based on the computational expense of that job. The fault tolerance system recognizes that some jobs or threads being processed by a computer may be designed to fluctuate many times during the life of that job. For example, a job may last for a week. The fluctuations of the job during that week may vary significantly. Thus, simply considering the number of jobs being handled by a machine may not be an accurate way of assigning jobs. The fault tolerance system in one embodiment thus requires calculating and storing the job load for each job on a periodic, e.g., every second, basis. The fault tolerance system in one embodiment also requires that all instances monitor each other for failures, or at least be configured to be notified upon failure of any one of the other instances. The fault tolerance system also requires that the instances be able to independently determine whether its aggregate load is the lowest aggregate load of all surviving instances.

In one embodiment, the fault tolerance system may use a machine or instance's available capacity to determine whether a given instance should accept and process an orphaned job. For example, some machines in the cluster of related machines may have more processing capabilities than other machines. The available capacity may be calculated as maximum capacity minus aggregate load. When the fault tolerance system uses available capacity, an orphaned job with the highest load is assigned to the machine with the highest available capacity. Using the highest available capacity model may allow systems to include different machines with different maximum capacities or computational resources. This may be desirable because it may allow flexibility in the hardware being used, and can provide reduced costs to the applications using the disclosed fault tolerance scheme. The available capacity for each instance or machine may be stored in the synchronization device.

The fault tolerance system must be configured to ensure that once an orphaned job is assigned to a surviving instance, no other instance attempts to handle that already-assigned orphaned job. In one sense, a job that is orphaned by a failed instance can no longer be considered orphaned after it is assigned to a surviving instance.

Figure 11:
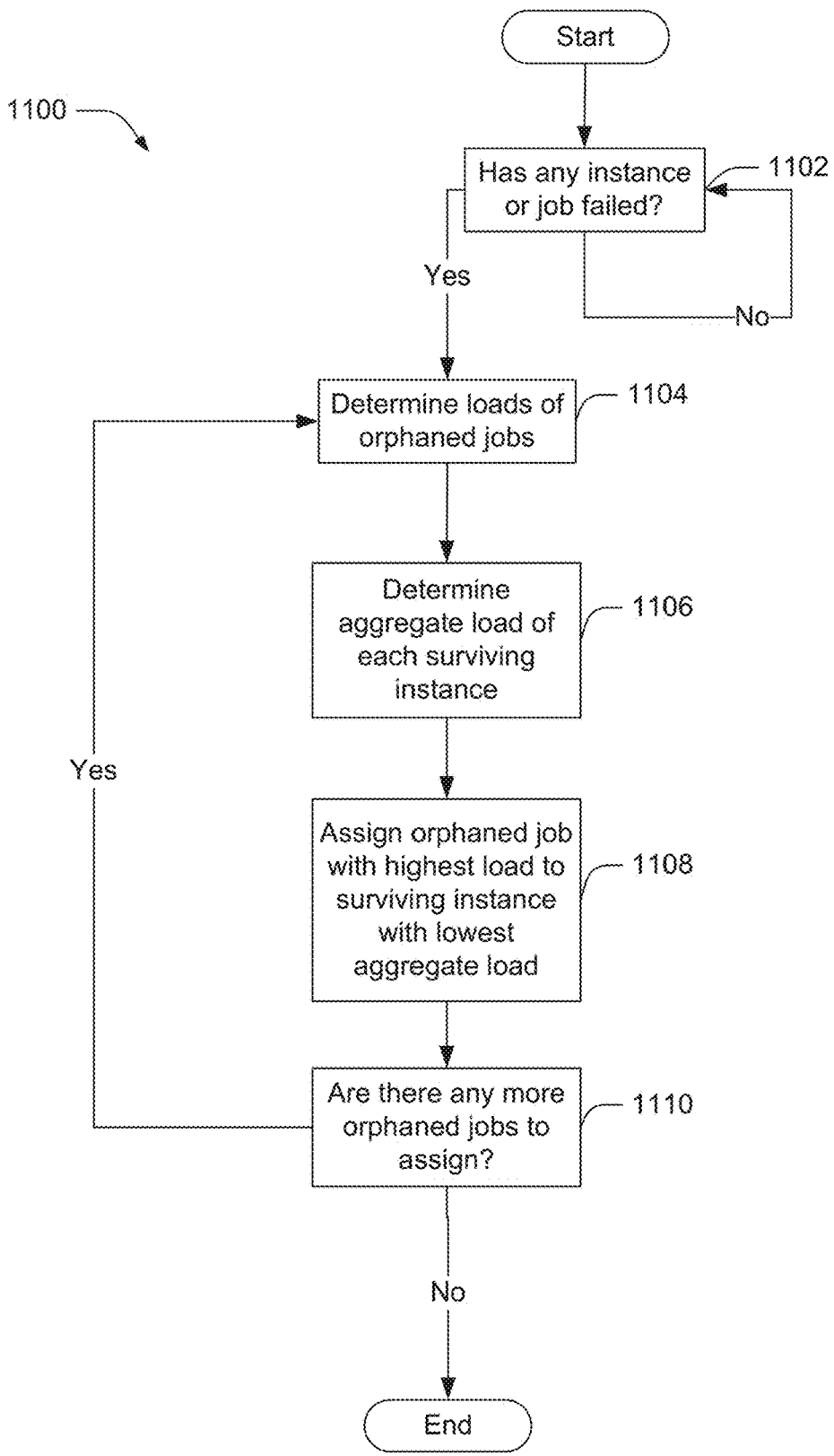
FIG. 11 depicts an example flowchart for implementing a fault tolerance system according to the disclosed embodiments.

FIG. 11 illustrates an example flowchart 1100 indicating a method of implementing the disclosed fault tolerance systems, as may be implemented with computer devices and computer networks, such as those described with respect to FIGS. 1 and 2. Embodiments may involve all, more or fewer actions indicated by the blocks of FIG. 11. The actions may be performed in the order or sequence shown or in a different sequence.

The fault tolerance system monitors whether any instance, machine or individual job in the cluster has failed, as shown in block 1102. Each instance may communicate with the other instances in the cluster to check for instance failure. Or, the synchronization device discussed above may facilitate the checking of instance failures. For example, each instance may communicate with the synchronization device, and the synchronization device can track whether any of the instances has failed. Upon failure of any of the instances, the fault tolerance system determines the loads of the jobs orphaned by the failed instance, as shown in block 1104. As discussed above, an orphaned job is a job that was assigned to be handled or processed by an instance that has failed. The job is considered orphaned because the instance that was supposed to process that job has terminated. Thus, it should be understood that orphaned jobs may become orphaned in a variety of ways, e.g., because they failed, the machine running them failed, or they were actively terminated, e.g., by a user of the system.

The fault tolerance system then determines the aggregate load of each surviving instance, as shown in block 1106. The fault tolerance system then assigns the orphaned job with the highest load to the surviving instance with the lowest aggregate load, as shown in block 1108. The fault tolerance system then checks whether there are any more orphaned jobs to assign to surviving instances. Once all orphaned jobs have been assigned to surviving instances, the process ends.

The fault tolerance system may also consider the available capacity of a machine or instance. Workload capacity is a reflection of an instance's ability to perform jobs. In particular, the fault tolerance system may assign orphaned jobs based on the available processing power of a machine, not just the current load being handled by the machine. An instance's total capacity may increase with increased computational resources (e.g., additional memory, faster processors, etc.). The fault tolerance system can compare available workload capacity between instances in order to determine which instance should accept an orphaned job. In one embodiment, the fault tolerance system may consider overall capacities of machines, not just available capacity.

Thus, the total capacity of a machine may be the maximum load that machine can handle, based on the computational resources of the machine. The available capacity of a machine may be the amount of total capacity that is not in use and is available for jobs.

For example, in one embodiment, a first instance with a total workload capacity of 10 may have a current workload of 3 and a second instance with a total workload capacity of 30 may have a current workload of 10. In this embodiment, the first instance has an aggregate load of 3 and an available capacity of 7 (10−3). The second instance has an aggregate load of 10 and an available capacity of 20 (30−10). If the fault tolerance system uses a lowest aggregate load model, the first instance with an aggregate load of 3 will accept a failed job over the second instance with an aggregate load of 10 in this embodiment. If however the fault tolerance system uses a highest available capacity model, the second instance with an available capacity of 20 will accept a failed job over the first instance with an available capacity of 7 in this embodiment. Whether the fault tolerance system uses a lowest aggregate load model or a highest available capacity model may be selected by users or owners of the financial exchange.

It should be appreciated that the fault tolerance system should calculate whether the surviving instance selected for assignment can handle the incoming load. If the fault tolerance system determines that the surviving instance selected for assignment cannot handle the incoming load, the fault tolerance system may attempt to start additional instances on new machines automatically. Or, the fault tolerance system may decide to not start the orphaned job anywhere, or it may start the job on an existing instance at the risk of exceeding that instance's capacity.

It should be appreciated that regardless of which instance receives a notification of the failed job first, because each of the instances can access the loads of other instances, the failed job will be accepted by the appropriate instance, depending on the scheme implemented (e.g., aggregate load or highest available capacity).

Figure 12:
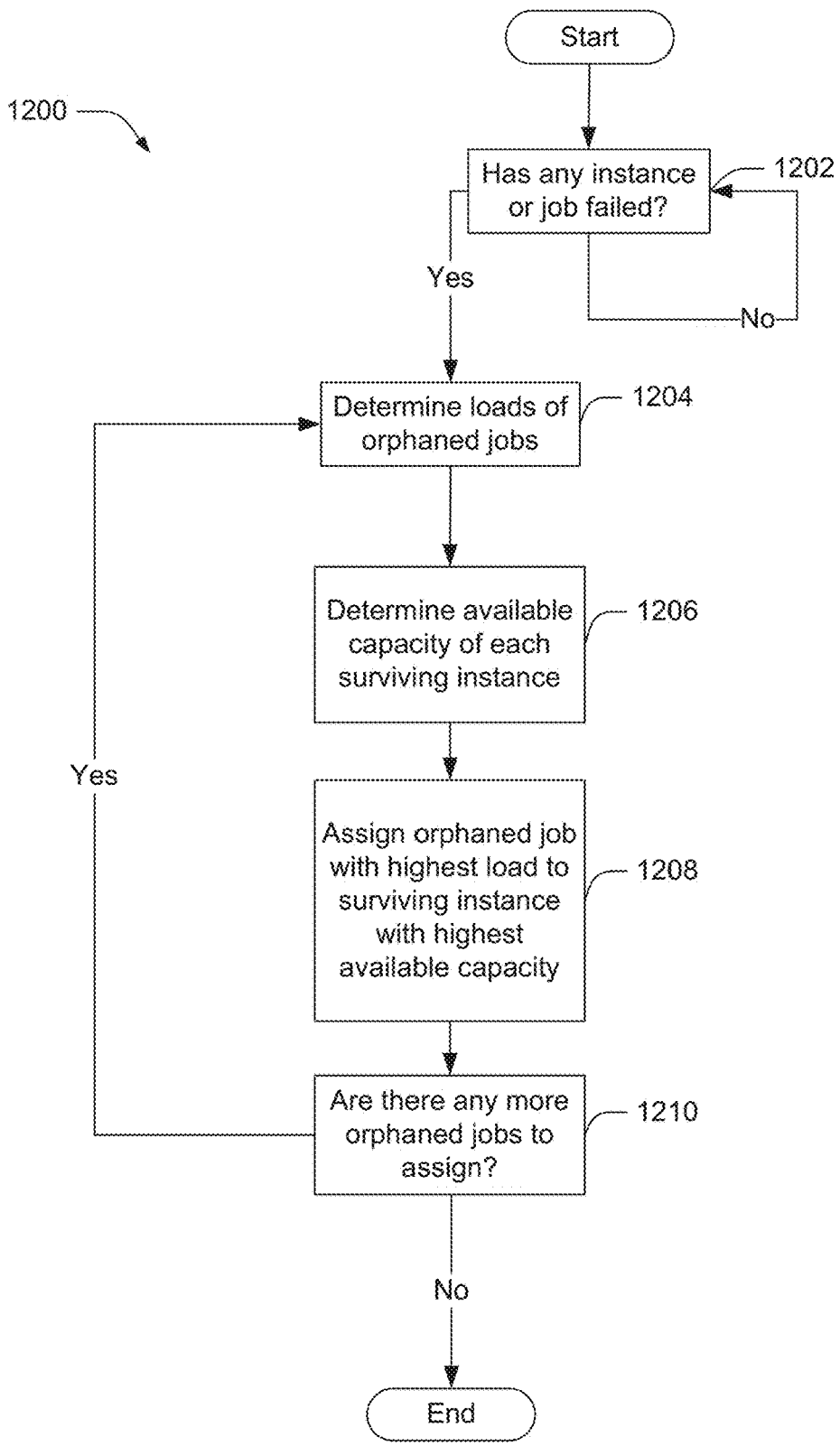
FIG. 12 depicts another example flowchart for implementing a fault tolerance system according to the disclosed embodiments.

FIG. 12 illustrates an example flowchart 1200 indicating such a method of implementing the disclosed fault tolerance systems, as may be implemented with computer devices and computer networks, such as those described with respect to FIGS. 1 and 2. Embodiments may involve all, more or fewer actions indicated by the blocks of FIG. 12. The actions may be performed in the order or sequence shown or in a different sequence.

As with process 1100, the fault tolerance method of process 1200 monitors whether any instance, machine or individual job in the cluster has failed, as shown in block 1202. Again, each instance may communicate with the other instances in the cluster to check for instance failure. Or, the synchronization device discussed above may facilitate the checking of instance failures. For example, each instance may communicate with the synchronization device, and the synchronization device can track whether any of the instances has failed. Upon failure of any of the instances (block 1202), the fault tolerance system determines the loads of the jobs orphaned by the failed instance, as shown in block 1204.

The fault tolerance system then determines the available capacity of each surviving instance, as shown in block 1206. The fault tolerance system then assigns the orphaned job with the highest job load to the surviving instance with the most available capacity, as shown in block 1208. The fault tolerance system then checks whether there are any more orphaned jobs to assign to surviving instances, as shown in block 1210. The process ends once all orphaned jobs have been assigned to surviving instances.

In one embodiment, there may be an additional load associated with a job, namely, a recovery load which defines how computationally expensive an orphaned job is to recover for an instance. Thus, not only may a job be associated with a job load defining the computational expense of performing that job, a job may also be associated with a recovery load defining the computational expense of recovering that job if it fails. This is particularly true of long-term jobs. Unlike short-term jobs, which simply restart on a different instance upon a failure event, long-term jobs need to be recovered on the new instance. It would be undesirable to restart a long-term job from the very beginning because the system state has likely changed since the time the long-term job was first begun. Recovering a job is a brief, initial event that is typically higher in cost than the normal processing job load associated with a job. In other words, an instance may experience a brief spike in overall load, before settling onto the new load.

Figure 13:
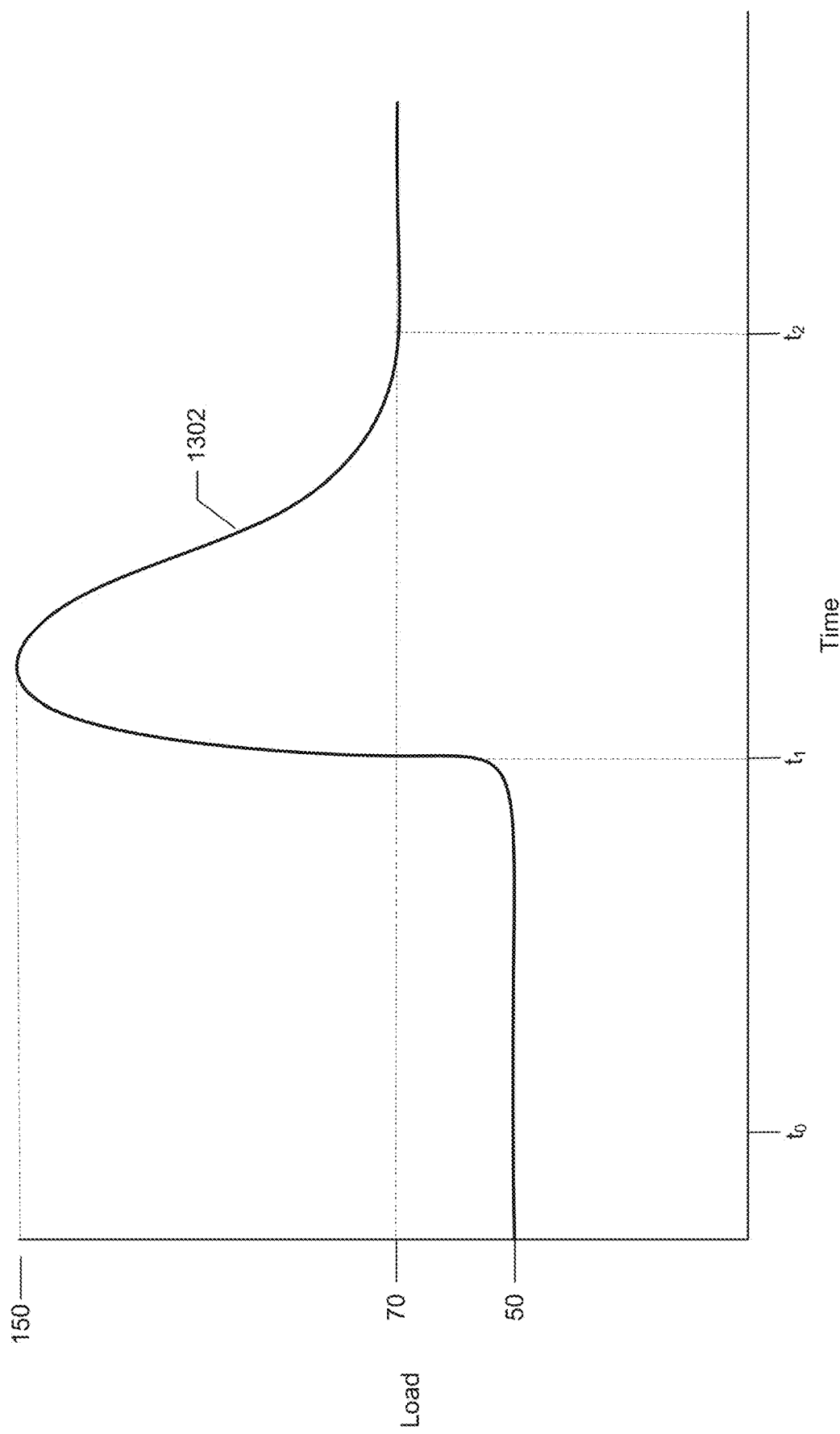
FIG. 13 illustrates an example graph of a load of an instance recovering an orphaned job in a fault tolerance system according to the disclosed embodiments.

FIG. 13 illustrates an example graph of a recovery spike in the load of a surviving instance A that accepts and processes a failed job B. At time $t=t_0$ before the instance has accepted any failed job, the load may be, e.g., 50, which represents the computational expense for performing the job or jobs that are currently assigned to instance A. At time $t=t_1$, instance A accepts an orphaned job B, which has a recovery load of 80 and a job load of 20. In other words, the load on instance A to recover job B will be 80. After job B has been fully recovered by instance A, the load on instance A to perform job B will be 20.

Thus, at time $t=t_1$, the overall load of instance A increases to 150 (50 original load plus 80 recovery load of orphaned job B). In the example of FIG. 13, the job has been fully recovered by time $t=t_2$. Thus, as shown in FIG. 13, the load of instance A settles at load 50 after time $t=t_2$.

FIG. 13 thus illustrates an example of a load curve for an instance recovering a failed long-term job. In one embodiment, the fault tolerance system factors in the recovery load in determining where to assign an orphaned job. In other words, the fault tolerance system in one embodiment may look at both the expense of performing a job as well as the expense of recovering a job in order to determine how that job is assigned.

It should be appreciated that the recovery load may be less than, greater than or equal to the job load for a job. In other words, depending on the specific job being recovered, recovering the job may require more, less or the same amount of computational resources as performing the job.

When the recovery load of an orphaned job is considered, the fault tolerance system may assign orphaned jobs differently than when only the job load is considered. For example, if only a job load is considered, an example fault tolerance system may determine that an orphaned job should go to a given instance, e.g., instance X, because instance X has a higher available capacity than instance Y. However, when the recovery load of the orphaned job is considered, the fault tolerance system may assign the orphaned job to instance Y, even though instance X has a higher available capacity than instance Y. because the fault tolerance system may determine that instance Y can handle the recovery load of the orphaned job whereas instance X cannot handle the recovery load and associated recovery spike of the orphaned job.

In some cases, the recovery load determined for an orphaned job may depend on the surviving instances that are being considered for reassignment. For example, the fault tolerance system may be able to calculate that the recovery load for an orphaned job, if recovered on a first instance, may be 90, whereas the recovery load for that same orphaned job, if recovered on a second instance, may be 95. Thus, the fault tolerance system recognizes that it may be easier for the first instance to recover the orphaned job than for the second instance, perhaps, e.g., due to the orphaned job and the first instance being similar in nature (e.g., due to a load penalty and load discount described above).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer implemented method for providing fault tolerance to a plurality of machines, the method comprising:
    determining an aggregate load for each surviving machine of a plurality of surviving machines;
    calculating a recovery load of one or more orphaned jobs resulting from a terminating event; and
    selecting to recover and perform one or more of the orphaned jobs, by one or more of the surviving machines, based upon (i) the recovery load of the one or more orphaned jobs; (ii) the job load of the one or more orphaned jobs; and (iii) the aggregate loads of the surviving machines.

2. The computer implemented method of claim 1, wherein the recovery load defines a computational expense to recover an orphaned job on a surviving machine, and wherein the job load defines a computational expense to perform a job.

3. The computer implemented method of claim 1, further comprising recovering, by a surviving machine that selects an orphaned job, job recovery data associated with the selected orphaned job.

4. The computer implemented method of claim 3, wherein the job recovery data is stored in one of: a synchronization device in communication with each of the machines of the plurality of machines; one or more of the machines of the plurality of machines; or an external data store.

5. The computer implemented method of claim 3, wherein recovering the job recovery data includes one or more of: replaying recovery messages; accessing a snapshot; or accessing state data of the orphaned job.

6. The computer implemented method of claim 1, further comprising determining the job load of the one or more orphaned jobs based upon a load discount or penalty for performing the orphaned job on a particular surviving machine.

7. The computer implemented method of claim 1, wherein each of the jobs is a long-term job that generates or processes more than one transaction, and wherein the transaction includes saving or writing data to a memory or database or sending a message to a component not in the plurality of machines.

8. The computer implemented method of claim 1, which includes selecting one or more of the orphaned jobs by the surviving machine with the lowest aggregate load.

9. The computer implemented method of claim 1, wherein the plurality of machines comprise one or more of a market data generator for generating market data from a match engine of an exchange computing system; or a trade match report generator for reporting trade data from the match engine.

10. A computer system for providing fault tolerance to a plurality of machines, the computer system comprising:
 a processor; and
 a memory communicatively coupled to the processor, the memory comprising software that, when executed by the processor, performs operations that cause the processor to:
  determine an aggregate load for each surviving machine of a plurality of surviving machines;
  calculate a recovery load of one or more orphaned jobs resulting from a terminating event; and
  select to recover and perform one or more of the orphaned jobs by one or more of the surviving machines based upon (i) the recovery load of the one or more orphaned jobs; (ii) the job load of the one or more orphaned jobs; and (iii) the aggregate loads of the surviving machines.

11. The computer system of claim 10, wherein the recovery load defines a computational expense to recover an orphaned job on a surviving machine, and wherein the job load defines a computational expense to perform a job.

12. The computer system of claim 10, wherein the software, when executed by the processor, performs operations that further cause the processor to recover job recovery data associated with an orphaned job selected by a surviving machine.

13. The computer system of claim 12, wherein the job recovery data is stored in one of: a synchronization device in communication with each of the machines of the plurality of machines; one or more of the machines of the plurality of machines; or an external data store.

14. The computer system of claim 12, wherein recovering the job recovery data includes one or more of: replaying recovery messages; accessing a snapshot; or accessing state data of the orphaned job.

15. The computer system of claim 10, wherein the software, when executed by the processor, performs operations that further cause the processor to determine the job load of the one or more orphaned jobs based upon a load discount or penalty for performing the orphaned job on a particular surviving machine.

16. The computer system of claim 10, wherein each of the jobs is a long-term job that generates or processes more than one transaction, and wherein the transaction includes saving or writing data to a memory or database or sending a message to a component not in the plurality of machines.

17. The computer system of claim 10, wherein the software, when executed by the processor, performs operations that further cause the processor to select one or more of the orphaned jobs for the surviving machine with the lowest aggregate load.

18. The computer system of claim 10, wherein the plurality of machines comprise one or more of a market data generator for generating market data from a match engine of an exchange computing system; or a trade match report generator for reporting trade data from the match engine.

19. A computer system for providing fault tolerance to a plurality of machines, the computer system comprising:
 means for determining an aggregate load for each surviving machine of a plurality of surviving machines;
 means for calculating a recovery load of one or more orphaned jobs resulting from a terminating event; and
 means for selecting to recover and perform one or more of the orphaned jobs, by one or more of the surviving machines, based upon (i) the recovery load of the one or more orphaned jobs; (ii) the job load of the one or more orphaned jobs; and (iii) the aggregate loads of the surviving machines.

20. A computer implemented method for providing fault tolerance to a plurality of machines, the method comprising:
 determining an aggregate load for each surviving machine of a plurality of surviving machines;
 calculating a recovery load of one or more orphaned jobs resulting from a terminating event; and
 selecting to recover and perform one or more of the orphaned jobs, by one or more of the surviving machines, based upon the recovery load of the one or more orphaned jobs; and the aggregate loads of the surviving machines.

* * * * *